(12) United States Patent
Pilla et al.

(10) Patent No.: US 7,728,274 B2
(45) Date of Patent: Jun. 1, 2010

(54) IMAGING SYSTEM WITH NEGATIVE ELECTRON AFFINITY PHOTOCATHODE

(75) Inventors: Subrahmanyam Pilla, 8905 High Meadows Dr., Plano, TX (US) 75025; Srinivas Kadiyala, Sarasota, FL (US)

(73) Assignee: Subrahmanyam Pilla, Plano, TX (US)

( * ) Notice: Subject to any disclaimer, the term of this patent is extended or adjusted under 35 U.S.C. 154(b) by 123 days.

(21) Appl. No.: 11/693,990

(22) Filed: Mar. 30, 2007

(65) Prior Publication Data
US 2008/0237771 A1 Oct. 2, 2008

(51) Int. Cl.
*H01J 43/00* (2006.01)
*H01J 40/06* (2006.01)

(52) U.S. Cl. .................. 250/214 LA; 313/542

(58) Field of Classification Search ........... 250/214 VT, 250/207, 214 LA, 330; 257/458; 313/542–544, 313/103 R, 103 CM
See application file for complete search history.

(56) References Cited

U.S. PATENT DOCUMENTS

| | | | |
|---|---|---|---|
| 3,959,045 A | 5/1976 | Antypas | |
| 3,987,299 A | 10/1976 | Mulder | |
| 4,463,252 A | 7/1984 | Brennan | |
| 4,468,101 A | 8/1984 | Ellis | |
| 4,498,225 A * | 2/1985 | Gutierrez et al. | 438/20 |
| 4,686,556 A * | 8/1987 | Dietrich | 257/10 |
| 5,084,780 A | 1/1992 | Phillips | |
| 5,165,079 A | 11/1992 | Schulz-Hennig | |
| 5,268,570 A | 12/1993 | Kim | |
| 5,282,092 A | 1/1994 | Wilhelms | |
| 5,378,640 A | 1/1995 | Kim | |
| 5,471,051 A * | 11/1995 | Niigaki et al. | 250/214 VT |
| 5,981,935 A | 11/1999 | Raverdy | |
| 6,069,445 A * | 5/2000 | Smith | 313/541 |
| 6,121,612 A * | 9/2000 | Sinor et al. | 250/330 |
| 6,437,491 B1 | 8/2002 | Estrera | |
| 6,597,112 B1 | 7/2003 | Sillmon | |

(Continued)

OTHER PUBLICATIONS

J.R. Waldrop, "Schottky-barrier height of ideal metal contacts to GaAs", Appl. Phys. Lett., vol. 44, No. 10, May 15, 1984, pp. 1002-1004.

(Continued)

*Primary Examiner*—Thanh X Luu
*Assistant Examiner*—Jennifer Bennett
(74) *Attorney, Agent, or Firm*—Pillsbury Winthrop Shaw Pittman LLP

(57) ABSTRACT

A viewing system configured to combine multiple spectral images of a scene, the system includes a spectral beam separator configured to split an incoming beam of radiation into a first and a second beam of radiation, the first beam of radiation including radiations substantially in a first spectral band and the second beam of radiation including radiations substantially in a second spectral band; an image intensifier configured to intensify the second beam of radiation, the image intensifier including a photocathode configured to produce a flux of photoelectrons with substantially increased efficiency when exposed to the second beam of radiation, the photocathode constructed and arranged to substantially absorb all the radiations in the second beam of radiation; a current amplifier configured to amplify the flux of photoelectrons; and a display system configured to display an image of the scene in the second spectral band based on the amplified flux of electrons simultaneously with an image of the scene in the first spectral band.

35 Claims, 10 Drawing Sheets

U.S. PATENT DOCUMENTS

| | | | |
|---|---|---|---|
| 6,762,884 | B2 | 7/2004 | Beystrum |
| 6,821,245 | B2 | 11/2004 | Cline |
| 6,827,577 | B1 | 12/2004 | Fulbrook |
| 6,957,992 | B2 | 10/2005 | Iosue |
| 6,960,879 | B2 | 11/2005 | Koch |
| 7,002,132 | B2 | 2/2006 | Negi |
| 7,015,642 | B2 | 3/2006 | Gaber |
| 7,057,788 | B2 | 6/2006 | Ohbayashi |
| 7,064,486 | B1 | 6/2006 | Mabry |
| 7,079,307 | B2 * | 7/2006 | Chun Liu et al. ............ 359/326 |
| 7,092,013 | B2 | 8/2006 | Bacarella |
| 7,109,468 | B2 | 9/2006 | Riches |
| 2005/0065406 | A1 | 3/2005 | Cline |

OTHER PUBLICATIONS

Product brochure, ITT Industries FS9910 Series "Non-Inverting Image Intensifier, Gen 3, 18mm for Special Low-Light-Level Applications", 2 pages.

Benn et al., "La Palma night-skY brightness", Department of Physics, University of Kent, Canterbury, Kent, United Kingdom, pp. 1-26.

Jinliang Yan, "The gain performance research and analysis of aluminised MCP in third-generation image tube," SPIE, vol. 2894, pp. 206-210, 1996.

Kevin Krisciunas, "A Model of the Brightness of Moonlight", Astromonical Society of the Pacific, vol. 103, pp. 1033-1039, Sep. 1991.

Xiaoqing et al., "Experiment and analysis of (CS,O) activation for NEA photocathode preparation,", Advanced Materials and Devices for Sensing and Imaging, SPIE, vol. 4919 (2002), pp. 83-90.

Ishimura et al., "Dark current and diffusion length in InGaAs photodiodes grown on GaAs substrates," Appl. Phys. Lett., vol. 56, No. 7, Feb. 12, 1990, pp. 644-646.

Jensen et al., "Generalized electron emission model for field, thermal, and photoemission," Appl. Phys. Lett., vol. 81, No. 20, Nov. 11, 2002, pp. 3867-3869.

Pastuszka et al., "Transverse energy spread of photoelectrons emitted from GaAs photocathodes with negative electron affinity", Appl. Phys. Lett,. vol. 71, No. 20, Nov. 17, 1997, pp. 2967-2969.

Bruno et al., "Advanced image intensifier systems for low-light high-speed imaging," SPIE, 19th International Congress on High-Speed Photography and Photonics (1990) vol. 1358, pp. 109-116.

Illes P. Csorba, "Recent advancements in the field of image intensification: the generation 3 wafer tube," Applied Optics, vol. 18, No. 14, Jul. 15, 1979, pp. 2440-2444.

B. Harbecke, "Coherent and Incoherent Reflection and Transmission of Multilayer Structures," Applied Phys. B, vol. 29, (1986), pp. 165-170.

Mitsas et al., "Generalized matrix method for analysis of coherent and incoherent reflectance and transmittance of multilayer structures with rough surfaces, interfaces, and finite substrates," Applied Optics, vol. 34, No. 10, Apr. 1, 1995, pp. 1678-1683.

Baum et al., "Negative electron affinity photocathodes as high-performance electron sources Part 1: achieve of ultra-high brightness from an NEA photocathode," SPIE, vol. 2522, pp. 208-219, 1995.

Alfred H. Sommer, "Brief history of photoemissive materials," SPIE, vol. 2022 Photodetectors and Power Meters (1993), pp. 2-17.

Estrera et al., "Development of Extended Red (1.0-1.3 μm) Image Intensifiers", SPIE, vol. 2551, pp. 135-144, 1995.

Munoz et al., "Optical constants of $In_{0.53}Ga_{0.47}As/InP$: Experiment and modeling," J. of App. Phy., vol. 92, No. 10, Nov. 15, 2002, pp. 5878-5885.

Coutal et al., "Fabrication and characterization of ITO thin films deposited by excimer laser evaporation," Thin Solid Films, vol. 288 (1996), pp. 248-253.

Laux et al., "Room-temperature deposition of indium tin oxide thin films with plasma ion-assisted evaporation,", Thin Solid Films, vol. 335 (1998), pp. 1-5.

Granqvist et al., "Transparent and conducting ITO films: new developments and applications," Thin Solid Films, vol. 411 (2002), pp. 1-5.

Gallas et al., "Making an omnidirectional reflector," Applied Optics, vol. 40, No. 28, Oct. 1, 2001, pp. 5056-5063.

Konstantatos et al., "Ultrasensitive solution-cast quantum dot photodetectors," Nature, vol. 442, No. 13, Jul. 2006, pp. 180-183.

Chen et al., "Application Study of Measurement Technology of the Parameters on NEA Photocathode," SPIE, vol. 6029, pp. 602916-1-602916-10.

Milnes et al., "Heterojunction Photocathode Concepts", Appl. Phys. Lett., vol. 19, No. 10, Nov. 15, 1971, pp. 383-385.

W.E. Spicer, "Negative Affinity 3-5 Photocathodes: Their Physics and Technology," Appl. Phys., vol. 12 (1977), pp. 115-130.

Kim et al., "Electrical, optical, and structural properties of indium-tin-oxide thin films for organic light-emitting devices," J. of Appl. Physics., vol. 86, No. 11, Dec. 1, 1999, pp. 6451-6461.

R. Ludeke, "Schottky barrier formation of Ag on GaAs(110)," J. Vac. Sci Techno. B, vol. 1, No. 3, Jul.-Sep. 1983, pp. 581-587.

"Optical properties of Gallium Arsenide (GaAs)", information pages from website: www.ioffee.rssi.ru/SVA/NSM/Semicond/GaAs/optic.html, 3 pages, Dec. 14, 2006.

"Tantalum Oxide, $Ta_2O_5$, for Optical Coating", information pages from CERAC, Inc.:www.cerac.com/pubs/proddata/ta205/htm, 3 pages, Dec. 14, 2006.

Rouleau et al., "GaAs substrate cleaning for epitaxy using a remotely generated atomic hydrogen beam", J. App. Phys, vol. 73, No. 9, pp. 4610-4613, May 1, 1993.

* cited by examiner

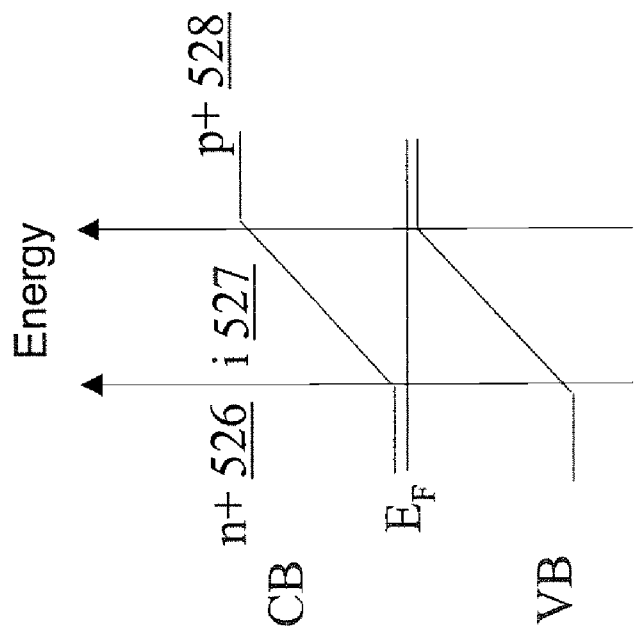
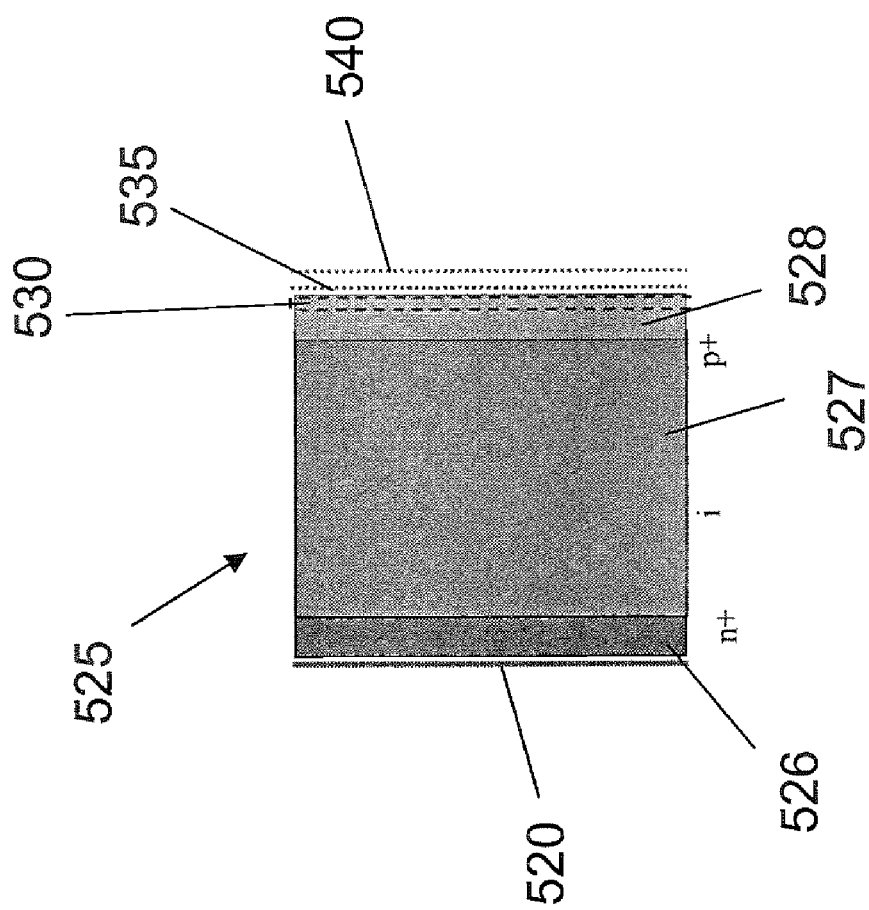
FIG. 8b
FIG. 8a

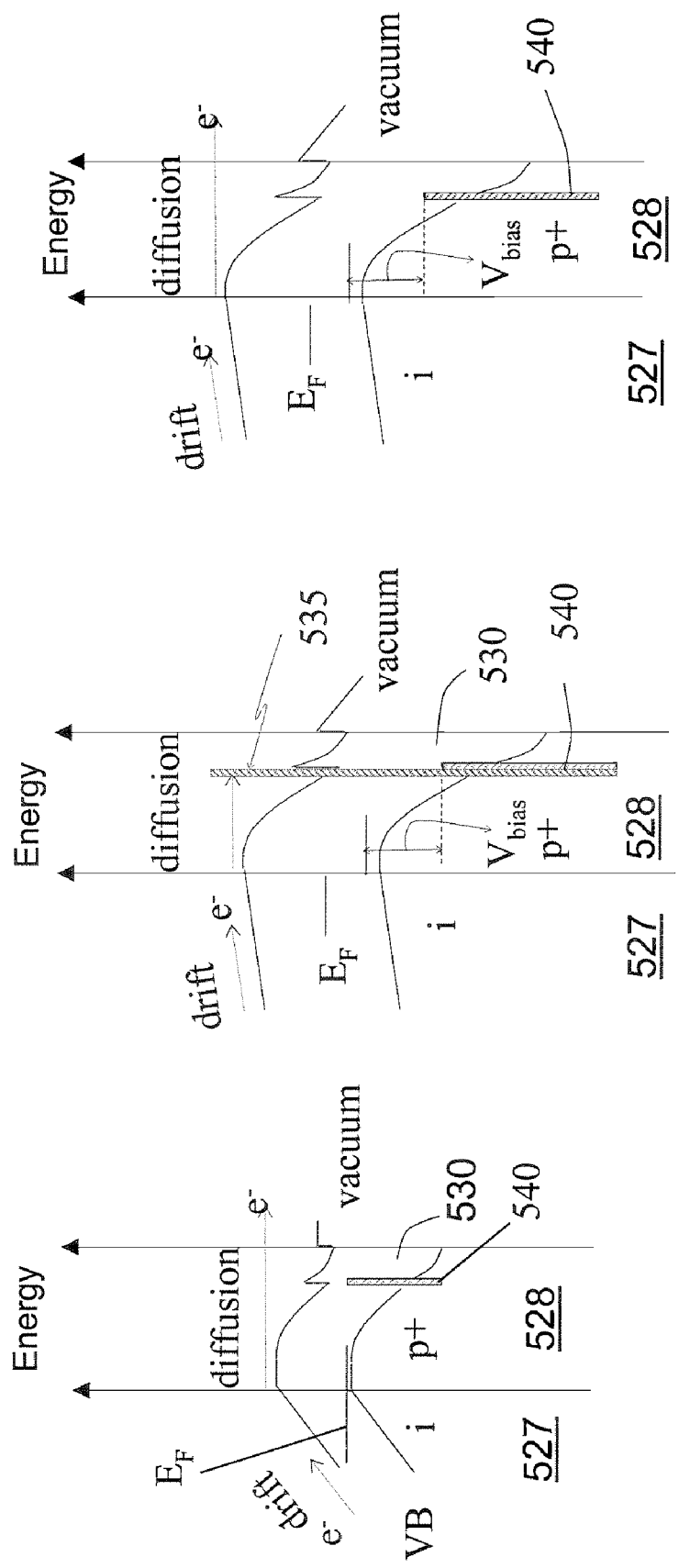

IMAGING SYSTEM WITH NEGATIVE ELECTRON AFFINITY PHOTOCATHODE

BACKGROUND

1. Field

The present application relates to an imaging system.

2. Description of Related Art

Night vision cameras are the mainstay of security systems, search and rescue systems, air traffic control systems, as well as in certain astronomical and scientific missions. Night vision cameras are designed to operate in low illumination conditions where both low intensity visible light and near-IR light (both ambient as well as black body radiation) are utilized for image formation. In military and security related applications, due to the harsh and rapidly changing environmental conditions under which cameras need to operate, two separate video displays are provided, one for the visible spectrum and the other for the near infra-red spectrum. The color camera displays the image when the ambient light intensity is high enough, such as when the subject frame is illuminated by an external visible light source (at dawn or dusk). When the ambient light is low, the night vision camera is turned on to view the same subject frame in low light conditions.

A night vision camera includes an image intensifier to amplify the image by several orders with little distortion. Typically, in the image intensifier, the incident low light (lower than 500 μlux) flux is first converted to electron current in a photoconductive layer. This current is further amplified by $10^4$ to $10^5$ times using an appropriate current amplifier. On the back of the current amplifier, a phosphor layer is deposited which emits greenish light in response to the current incident. As the current amplifier amplifies the incident light faithfully, the emitted greenish light will be a replica of the incident low light image. This greenish light may be focused into the object piece of a Black and White (B/W) CCD camera to obtain the final night vision video. Generally, the current intensifier has an upper limit on the total amount of charge it can deliver in its lifetime after which the gain dramatically drops. Therefore, the regions that are exposed to high intensity light quickly lose their ability to provide high gain, leading to noise, black spots, and graininess in the video over continued operation of the camera.

In real world situations, such as in hot pursuit of a suspect in an otherwise low light urban setting, the above night vision camera will work adequately providing excellent video until a bright light source such as a passing car's headlights or a street light comes into view. In such a scenario, the night vision video shows distinct "blooming", i.e., whitening of a large part of the screen which blankets parts of the image that are otherwise in a low light region for the sensors. It takes a relatively long time for the current intensifier to recover from the blooming. The net loss of information during recovery of the current intensifier and/or during the switching from the night vision camera to the visible camera could be very costly under critical mission conditions. Also, the repeated exposure to blooming causes the current intensifier to degrade quickly, as explained above, much faster than the manufacturer specified lifetime of the device leading to video noise.

SUMMARY

Thus, in order to enhance the operational life of the night vision camera and to avoid loss of visual information, it is desirable to obtain a highly efficient night vision camera in which the occurrence of blooming is significantly reduced. It is also desirable to provide a system in which both the night vision and visible video displays are continuously on without the operator's intervention.

In an embodiment of the invention, there is provided an imaging system including a spectral beam separator configured to split an incoming beam of radiation into a first and a second beam of radiation, the first beam of radiation including radiations substantially in a first spectral band and the second beam of radiation including radiations substantially in a second spectral band; an image intensifier configured to intensify the second beam of radiation, the image intensifier including a photocathode configured to produce a flux of photoelectrons when exposed to the second beam of radiation, the photocathode constructed and arranged to substantially absorb all the radiations in the second beam of radiation; a current amplifier configured to amplify the flux of photoelectrons; and a display system configured to display an image of the scene in the second spectral band based on the amplified flux of electrons.

In another embodiment of the invention, there is provided a method for displaying an image of a scene, the method including splitting an incoming beam of radiation into a first and a second beam of radiation, the first beam of radiation including radiations substantially in a first spectral band and the second beam of radiation including radiations substantially in a second spectral band; intensifying the second beam of radiation, the intensifying including substantially absorbing in a photocathode all the radiations in the second beam of radiation and producing a flux of photoelectrons when the photocathode is exposed to the second beam of radiation; amplifying the flux of photoelectrons; and displaying an image of the scene in the second spectral band based on the amplified flux of electrons.

In an embodiment, there is provided an imaging system including an image intensifier configured to intensify a beam of radiation, the image intensifier including a photocathode configured to produce a flux of photoelectrons when exposed to the beam of radiation, the beam of radiation including essentially radiations in a selected spectral band, the photocathode including an intrinsic semiconductor layer, a n+ layer, and a p+ doped semiconductor layer, the intrinsic semiconductor layer substantially thicker than the n+ and p+ doped layers such that substantially all of the photoelectrons are produced in the intrinsic layer; a current amplifier configured to amplify the flux of photoelectrons; and a display system configured to display an image of the scene in the selected spectral band associated to the beam of radiation based on the amplified flux of electrons.

In an embodiment of the invention, there is provided an image intensifier configured to intensify a beam of radiation, the image intensifier including a photocathode configured to produce a flux of photoelectrons when exposed to the beam of radiation, the beam of radiation including essentially radiations in a selected spectral band, the photocathode including an intrinsic semiconductor layer and a p+ doped semiconductor layer, the intrinsic semiconductor layer substantially thicker than the p+ doped layer such that substantially all of the photoelectrons are produced in the intrinsic layer.

Other objects, features and advantages of the present application will become apparent from the following detailed description, the accompanying drawings, and the appended claims.

BRIEF DESCRIPTION OF THE DRAWINGS

FIGS. 8a and 8b show, respectively, a schematic cross section of a portion of the photocathode and its corresponding energy band diagram in accordance with an embodiment of the invention;

FIGS. 9a-c show the energy band diagrams for the photocathode structure of FIG. 5 with and without forward bias, in accordance with an embodiment of the invention.

DETAILED DESCRIPTION

The Figures described hereinafter illustrate various exemplary embodiments of the invention. These embodiments are in no way intended to be limiting, and are intended only as examples for facilitating an understanding of the principles of the present invention.

In an embodiment of the invention there is provided a visible—night vision combo optical system that is adapted to combine multiple spectral images of a scene. In one implementation, the system includes a spectral beam separator configured to split an incoming beam of radiation into a first and a second beam of radiation, the first beam of radiation including radiations substantially in a first spectral band and the second beam of radiation including radiations substantially in a second spectral band. The first spectral band may include the visible band. The second radiation band may include the near infra-red and portions of the deep infra-red. The optical system also includes an image intensifier configured to intensify the second beam of radiation. The image intensifier includes a photocathode configured to produce a flux of photoelectrons when exposed to the second beam of radiation. The photocathode is constructed and arranged to substantially absorb all the radiations in the second beam of radiation. In addition, the optical system includes a current amplifier configured to amplify the flux of photoelectrons, and an imaging system configured to display an image of the scene in the second spectral band based on the amplified flux of electrons. The optical system is adapted to significantly increase both the external quantum efficiency and the internal quantum efficiency of the system. The external quantum efficiency is increased by channeling and absorbing substantially all the radiations of the second spectral band in the photocathode. The internal quantum efficiency is improved by ensuring that substantially all the photoelectrons generated within the photocathode will not recombine and will readily exit the image intensifier.

Figure 1:
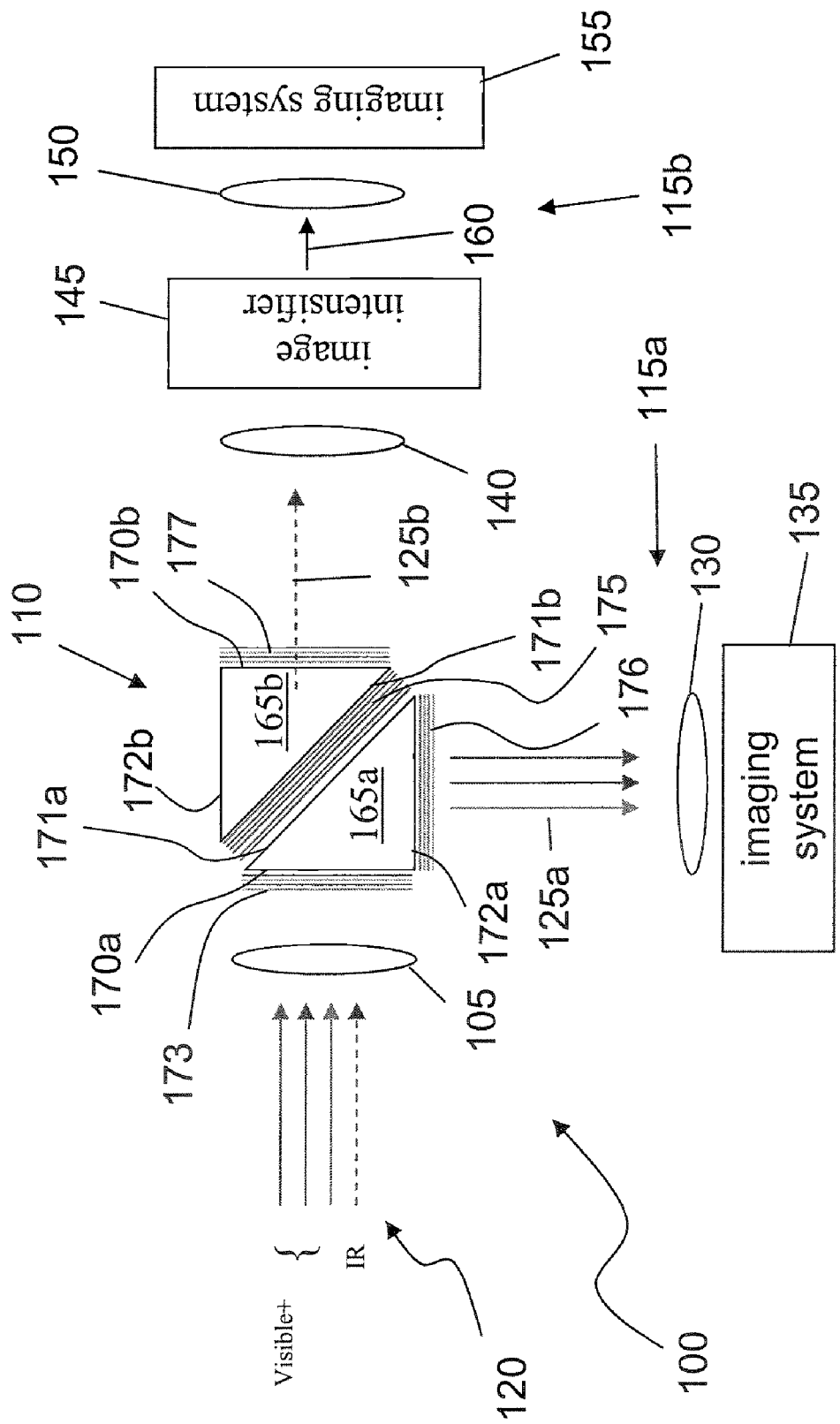
FIG. 1 shows a night vision—visible combo optical system in accordance with an embodiment of the invention.

FIG. 1 shows an optical system 100 in accordance with an embodiment of the invention. The optical system 100 is a visible—night vision combo display device that is adapted to provide simultaneous visible and night vision displays without bloomings. The optical system 100 is constructed and arranged such that the incoming radiation collected through the objective of the system is divided into two spectral bands and the subject image is displayed simultaneously as two independent videos with the same field of view.

The optical system 100 includes an objective lens 105, a beam separator 110, a first optical branch 115a and a second optical branch 115b. The beam separator 110 is constructed and arranged to split the incoming beam of radiation 120 into a first radiation beam 125a having a first spectral band and a second radiation beam 125b having a second spectral band. In the embodiment of FIG. 1, the first optical branch 115a is the visible branch and the second optical branch 115b is the near infra-red/infra-red branch. Further, in this embodiment, the first spectral band includes the visible band and extends in the range from about 350 nm to about 680 nm. The second spectral band includes the near infra-red band and a portion of the infra-red band and extends in the range from about 680 nm to about 1400 nm.

The first optical branch 115a includes a first optical assembly 130 and a first imaging system 135. The first optical assembly 130 may include one or more lenses that is/are configured to direct the first radiation beam 125a toward the first imaging system 135. The first imaging system 135 is configured to provide image information in the first spectral band, e.g., the visible band. In the embodiment of FIG. 1, the first imaging system 135 includes a visible video camera.

The second optical branch 115b includes, successively, a second optical assembly 140, an image intensifier 145, a third optical assembly 150 and a second imaging system 155. The second optical assembly 140 may include one or more lenses that is/are configured to direct the second radiation beam 125b toward the image intensifier 145. The image intensifier 145 is configured to amplify the second radiation beam 125b. The amplified second radiation beam 125b, denoted as 160 in FIG. 1, is focused on the second imaging system 155 with the third optical assembly 150. Similarly, the third optical assembly 150 may include one or more lenses. The second imaging system 155 is configured to provide image information in the second spectral band. In the embodiment of FIG. 1, the second imaging system 155 includes a black and white camera.

In FIG. 1, the beam separator 110 is constructed and arranged to selectively transmit the first radiation beam 125a, including the visible spectral band, toward the first optical branch 115a and the second radiation beam 125b, including the near infra-red spectral band and portions of the infra-red spectral band, toward the second optical branch 115b. To this effect, the beam separator 110 includes a first prism 165a and a second prism 165b that each include a first side 170a-b, a second side 171a-b and a third side 172a-b, as shown in FIG. 1. The first and second prisms 165a, 165b are positioned relative to each other such that the second sides 171a, 171b are substantially parallel to each other and inclined at about 45° relative to the direction of propagation of the first and second radiation beams 125a, 125b. In one implementation, the first and second prisms 165a, 165b may include BK7 glass or fused silica. The 45° angle is preferred and not limiting.

In order to substantially transmit the entire incoming radiation 120 into the beam separator 110, a first anti-reflective medium/coating 173 is provided on the first side 170a of the first prism 165a. The first anti-reflective medium/coating 173 acts as an index matching medium between the outside environment (e.g., air) and the first prism 165a and may include a superposed assembly of thin layers of materials, whose thicknesses and indexes are selected to optimize the transmission of the first and second spectral bands, i.e., the visible band and the near infra-red band and a portion of the infra-red band, into the first prism 165a. For example, in one configuration the first anti-reflective medium/coating 173 may consist of quarter wavelength optical thickness dielectric layers of high and low refractive index where the quarter wavelength optical thickness is set at mid-band. Specifically, the thickness(es) and the index(es) of the first anti-reflective medium/coating 173 may be optimized for maximum transmission at mid-band, i.e., about 725 nm for a total band that extends between about 350 nm and 1000 nm (visible and near infra-red). In this configuration, the first anti-reflective medium/coating 173 may produce a transmission of at least 90% of the first and second spectral bands into the first prism 165a.

The beam separator 110 also includes a spectral band separator 175 that is positioned between the second sides 171a-b of the first and second prisms 165a-b. The spectral band separator 175 is constructed and arranged to divide the incoming radiation 120, which is passed into the first prism 165a, into the first spectral band, i.e., the visible band, and the second spectral band, i.e., the near infra-red band and a portion of the infra-red band. In one implementation, the spectral band separator 175 includes a dichroic mirror that has a plurality of thin dielectric material layers. It is well known that ambient radiation either from sun or airglow is coherent up to at least an order of the wavelength. This coherence is responsible for the rainbow colors observed in thin soap films. Exploiting this inherent coherence at short optical path lengths, non-reflective optical coatings and dichroic mirrors may be designed to selectively transmit or reflect a specific spectral band. The dichroic mirror 175 may consist of approximately quarter wave optical thickness (for a 45° incidence angle) layers of high and low refractive index materials such as tantalum oxide $Ta_2O_5$ (high refractive index of about 2.4) and silicon dioxide $SiO_2$ (low refractive index of about 1.5) deposited on the second side 171b.

The dichroic mirror 175 may be either a cold or hot mirror. In the configuration of FIG. 1 where two spectral bands are split by the dichroic mirror, the spectral band separator 175 includes a cold dichroic mirror that is adapted to reflect the spectral band having lower radiation wavelengths than that of the second spectral band. In one implementation, the quarter-wave optical thickness of the layers in the dichroic mirror is chosen such that over 75%, and preferably over 90%, of deep-red and near infra-red (680 nm to 945 nm) radiation is transmitted (for cold mirror) while the visible spectral band, which is lower than 680 nm, is reflected with an efficiency greater than 75%, and preferably greater than 90%. If the dichroic mirror 175 is a hot mirror, reflection and transmission are interchanged while the efficiencies remain similar to the cold mirror.

Still referring to FIG. 1, the beam separator 110 also includes second and third anti-reflective mediums/coatings 176, 177 that are positioned respectively on the third side 172a of the first prism 165a and the first side 170b of the second prism 165b. The second anti-reflective medium/coating 176 acts as an index matching medium between the first prism 165a and the outside environment (e.g., air). Similarly, the third anti-reflective medium/coating 177 acts as an index matching medium between the second prism 165b and the outside environment (e.g., air). Each of the second and third anti-reflective mediums/coatings 176, 177 may include a superposed assembly of thin layers of materials, whose thicknesses and indexes are selected to optimize the transmission of the first and second spectral bands, i.e., the visible spectral band and the near infra-red band and a portion of the infra-red band, into the outside environment. For example, in one configuration, the second and third anti-reflective mediums 176, 177 may consist of quarter wavelength optical thickness dielectric layers of high and low refractive index where the quarter wavelength optical thickness is set at mid-band. Due to the possible leakage (about 10%) in the visible spectral band of the cold mirror 175, the third anti-reflective medium 177 may also be used to further reduce the transmission of any visible radiation toward the second optical branch 115b by a factor of at least ten if it is instead a cold or hot mirror of Table 1 (see below). The third anti-reflective medium/coating 177 acts as an additional filter for the visible spectral band (lower than 680 nm).

Figure 2:
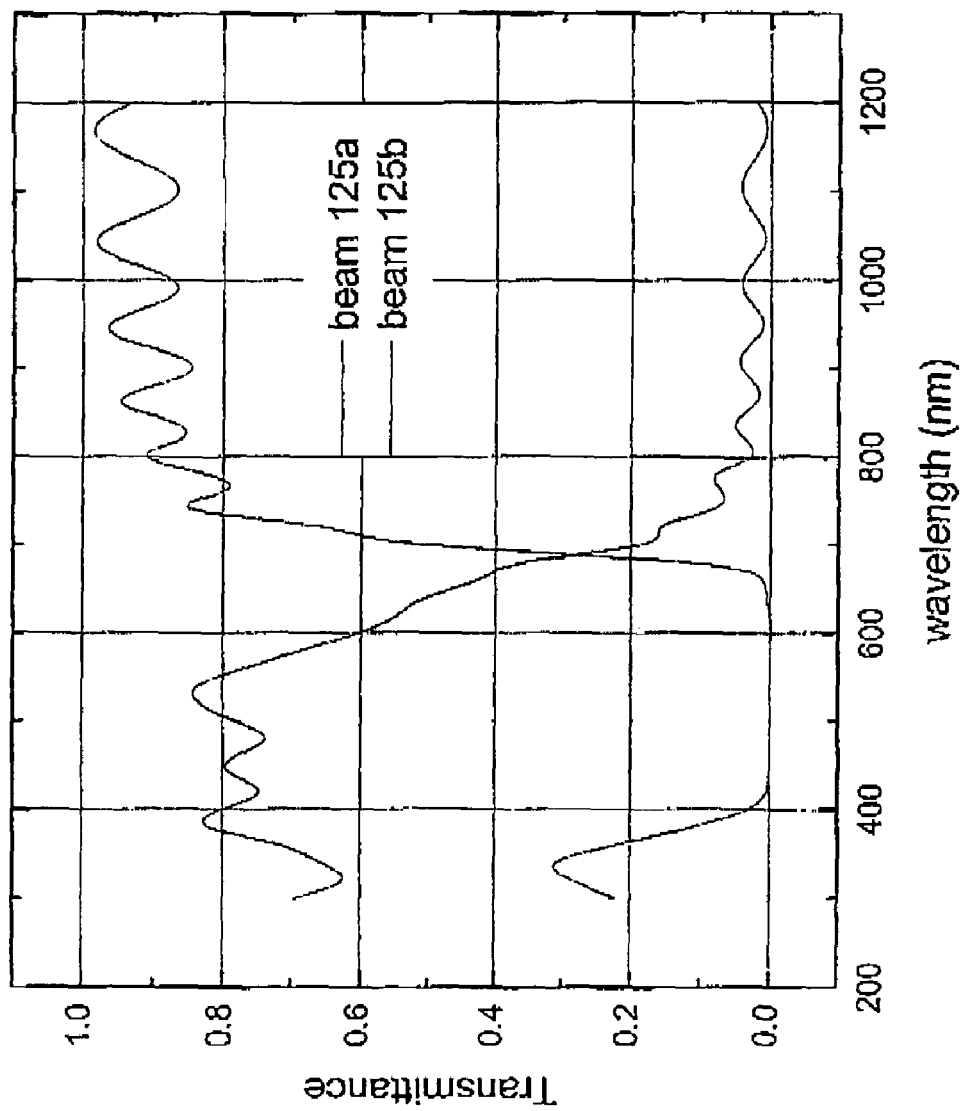
FIG. 2 shows the transmittance characteristics of a cold and a hot mirror for use in the spectral beam separator of the night vision—visible combo optical system in accordance with an embodiment of the invention.

Referring to FIG. 2, this figure shows the spectral characteristics of a combination of cold mirrors used in the spectral band separator or dichroic mirror 175 and 177, in accordance with an embodiment of the invention. Dichroic mirror 177 is positioned on the first side 170b of the second prism 165b. Calculations are performed for first and second prisms 165a-b including either a BK7 glass or a fused silica. FIG. 2 shows the theoretical power transmittance characteristics of cold mirrors including alternating layers of $Ta_2O_5$ (high refractive index (H) material) and $SiO_2$ (low refractive index (L) material) thin films used in the embodiment of FIG. 1. In these calculations, the wavelength dependent refractive index of materials, widely available in literature, is used. For the cold mirror 177, the dielectric stack includes thirty-five layers of Tantalum Oxide $Ta_2O_5$ (H) and Silicon dioxide $SiO_2$ (L). For the cold mirror 175, the dielectric stack includes thirty-nine layers of Tantalum Oxide $Ta_2O_5$ (H) and Silicon dioxide $SiO_2$ (L). The thicknesses of the Tantalum Oxide and the Silicon dioxide for exemplary cold and hot mirrors are provided in Table 1. A hot mirror can also be used as 177 (Table 1) if 175 is also replaced with a corresponding hot mirror. The layers are listed from the uppermost film deposited on the second prism 165b in both cases. To obtain the spectral response of beam 125b in FIG. 2, two cold mirrors of the type 177 (Table 1) and one cold mirror of type 175 are used. While one of the cold mirrors 177 is placed as shown in FIG. 1, the other can be placed on either surface of the lens 140 or on the outer surface of the entrance window of image intensifier 145.

TABLE 1

| | Cold Mirror (177) | | | Hot Mirror (177) | | | Cold Mirror (175) | |
|---|---|---|---|---|---|---|---|---|
| Layer | $Ta_2O_5$ (nm) | $SiO_2$ (nm) | Layer | $Ta_2O_5$ (nm) | $SiO_2$ (nm) | Layer | $Ta_2O_5$ (nm) | $SiO_2$ (nm) |
| 1 | 50 | | 1 | 138 | | 1 | 47.6 | |
| 2 | | 75 | 2 | | 243 | 2 | | 68.7 |
| 3 | 51.5 | | 3 | 138 | | 3 | 50 | |
| 4 | | 75 | 4 | | 243 | 4 | | 72.1 |
| 5 | 51 | | 5 | 138 | | 5 | 52.4 | |
| 6 | | 75 | 6 | | 243 | 6 | | 75.5 |
| 7 | 52 | | 7 | 138 | | 7 | 54.8 | |
| 8 | | 83 | 8 | | 243 | 8 | | 79 |
| 9 | 52 | | 9 | 123 | | 9 | 57 | |
| 10 | | 83 | 10 | | 219.5 | 10 | | 82.4 |
| 11 | 52 | | 11 | 123 | | 11 | 59.5 | |
| 12 | | 83 | 12 | | 219.5 | 12 | | 85.9 |
| 13 | 58.1 | | 13 | 123 | | 13 | 61.9 | |
| 14 | | 92.4 | 14 | | 219.5 | 14 | | 89.3 |
| 15 | 58.1 | | 15 | 123 | | 15 | 64.3 | |

TABLE 1-continued

| | Cold Mirror (177) | | | Hot Mirror (177) | | | Cold Mirror (175) | |
|---|---|---|---|---|---|---|---|---|
| Layer | Ta$_2$O$_5$ (nm) | SiO$_2$ (nm) | Layer | Ta$_2$O$_5$ (nm) | SiO$_2$ (nm) | Layer | Ta$_2$O$_5$ (nm) | SiO$_2$ (nm) |
| 16 | | 92.4 | 16 | | 219.5 | 16 | | 92.7 |
| 17 | 54.1 | | 17 | 109.5 | | 17 | 66.7 | |
| 18 | | 92.4 | 18 | | 195 | 18 | | 96.1 |
| 19 | 56.1 | | 19 | 109.5 | | 19 | 69 | |
| 20 | | 92.4 | 20 | | 195 | 20 | | 99.6 |
| 21 | 56.1 | | 21 | 109.5 | | 21 | 71.4 | |
| 22 | | 92.4 | 22 | | 195 | 22 | | 103 |
| 23 | 70.2 | | 23 | 109.5 | | 23 | 74.5 | |
| 24 | | 101.7 | 24 | | 195 | 24 | | 106.5 |
| 25 | 70.2 | | 25 | 109.5 | | 25 | 76.2 | |
| 26 | | 101.7 | 26 | | 195 | 26 | | 109.9 |
| 27 | 70.2 | | 27 | 101.2 | | 27 | 78.6 | |
| 28 | | 103.7 | 28 | | 185.2 | 28 | | 113.3 |
| 29 | 70.2 | | 29 | 101.2 | | 29 | 82 | |
| 30 | | 105.7 | 30 | | 185.2 | 30 | | 115 |
| 31 | 70.2 | | 31 | 101.2 | | 31 | 83.5 | |
| 32 | | 108.7 | 32 | | 185.2 | 32 | | 116.8 |
| 33 | 70.2 | | 33 | 101.2 | | 33 | 85.1 | |
| 34 | | 90.7 | 34 | | 185.2 | 34 | | 118.5 |
| 35 | 70.2 | | 35 | 101.2 | | 35 | 87.3 | |
| | | | | | | 36 | | 120.2 |
| | | | | | | 37 | 89.5 | |
| | | | | | | 38 | | 121.9 |
| | | | | | | 39 | 66 | |

As can be seen in FIG. 2, a cold mirror may be preferable over a hot mirror in the present application due to a transmission over 90% for wavelengths greater than 730 nm. Such a broadband response may be desirable for high bandwidth intensifiers based on Indium-Gallium, Arsenic (InGaAs) photocathode, which is responsive to radiation in the 600-1400 nm range. Moreover, due to short coherence length of ambient near infra-red radiation, it is desirable that the optical path length of the mirror stack be as thin as possible. In this regard the cold mirror with thinner films offers significant benefits over the hot mirror.

The first, second and third anti-reflective mediums 173, 176, 177 and the spectral band separator 175 (e.g., dichroic mirror) are optimized for a specific direction and angle of incidence. In the embodiment of FIG. 1, the dichroic mirror 175 is optimized for 450 incidence angle while the first, second and third anti-reflective mediums 173, 176, 177 are optimized for 900 incidences with directions shown for each face plane of the beam separator (e.g., beam splitter) 110. However, it will be appreciated that the beam separator and various mediums and coatings can be modified for other incidence angles following similar basic design criteria.

The beam separator described is not intended to be limiting and may have any suitable construction or configuration. Thus, in certain embodiments of the invention, the beam separator may be constructed differently to achieve different optical effects.

In operation, the incoming radiation 120 is incident on, successively, the objective 105 and the beam separator 110 (e.g. beam splitter). The beam separator 110 then splits the incoming radiation 120 into a first radiation beam 125a, the visible beam, and the second radiation beam 125b, the near infra-red and infra-red beam. In one implementation, separation of the incoming radiation 120 into the near infra-red and visible beams is done such that less than one percent of the visible radiation is incident on the second optical assembly 140 and the image intensifier 145.

Figure 3:
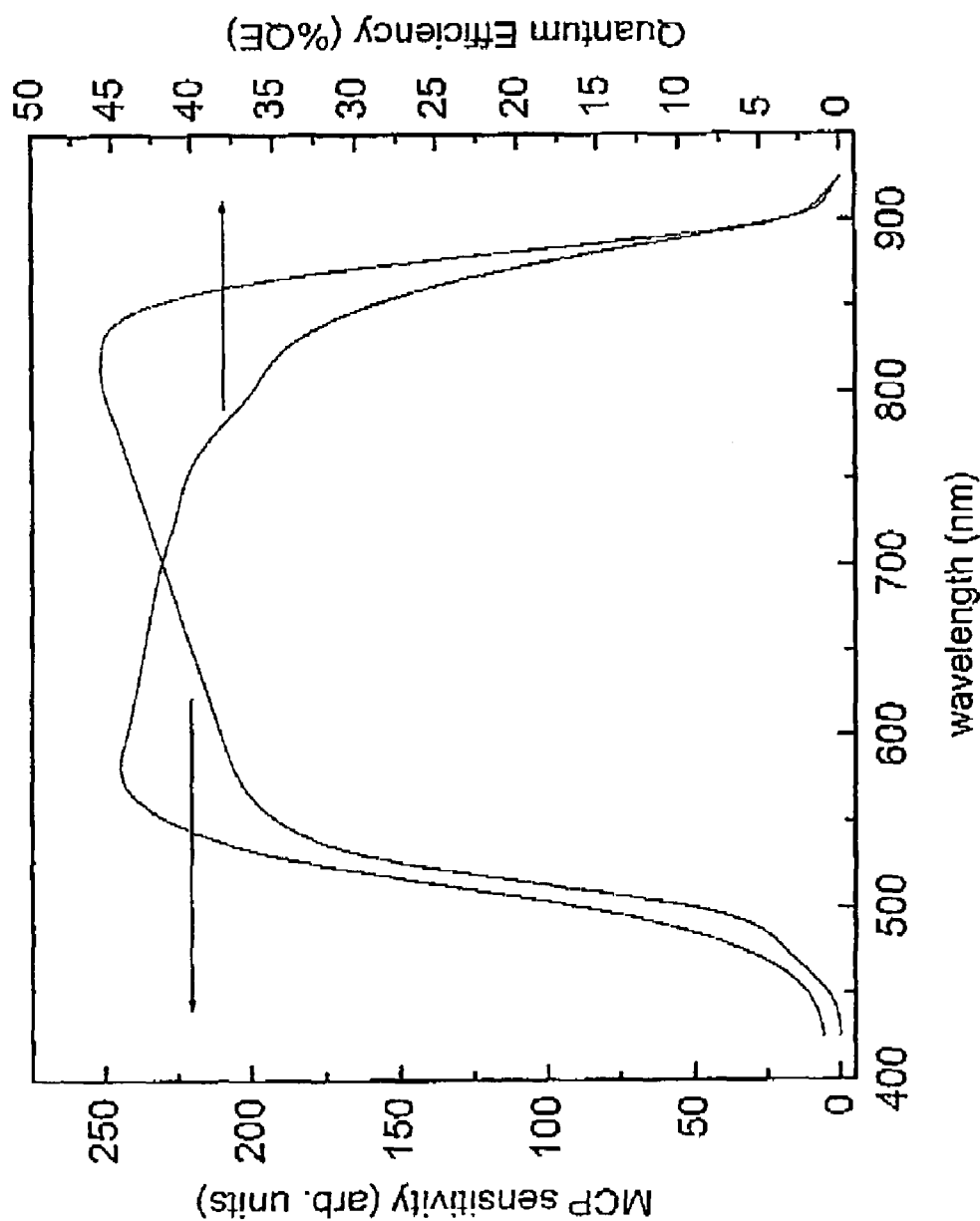
FIG. 3 shows the sensitivity of a current amplifier used in a conventional night vision system and the variation of the external quantum efficiency of a conventional night vision system as a function of radiation wavelength.

In most of the light sources that cause blooming in night vision cameras, the optical power is usually concentrated in the visible region of the electromagnetic spectrum ranging from about 350 nm to 680 nm. In the same spectral window, image intensifiers based on Gallium (III) Arsenide GaAs have higher quantum efficiency (QE) as well. FIG. 3 shows the variation of the typical quantum efficiency of an image intensifier with Gallium (III) Arsenide GaAs as a photoconductor as a function of radiation wavelength. FIG. 3 also shows the variation of a conventional current amplifier (in arbitrary units) as a function of radiation wavelength. The current amplifier is adapted to receive and amplify the electrons produced by the GaAs active layer. A quantum efficiency of 100% means that all the incident photons are transmitted to the Gallium (III) Arsenide GaAs image intensifier and that the ratio of the number of electrons exiting the image intensifier to the number of photons absorbed by the image intensifier is one. Gallium Arsenide is a direct band gap semiconductor (band gap of about 850 nm), which is characterized by the fact that the minimum of the conduction band lies directly above the maximum of the valence band in the momentum space. In a direct band gap semiconductor, electrons located in the minimum of the conduction band can combine directly with holes located in the maximum valence band without loss of momentum. As known in the art, the energy of the recombination across the bandgap will be emitted in the form of a photon.

As shown in FIG. 3, in the near infra-red band (for example at 830 nm), the total quantum efficiency is approximately one third its peak value at 570 nm. This is due to the fact that the absorption coefficient ($\alpha$) of a direct band-gap semiconductors such as Gallium (III) Arsenide GaAs decreases with increasing wavelength below the material's band-gap. As the Gallium (III) Arsenide GaAs layer in the image intensifier is relatively thin (e.g., lower than about 1 μm), some of the incident radiations in the near infra-red do not get absorbed completely in the GaAs layer resulting in lower quantum efficiency of the night vision camera. For example, at about 830 nm, $\alpha=10000$ cm$^{-1}$ resulting in about 37% of the incident radiation not being absorbed in the GaAs layer. This unique combination of higher spectral power of the incident radiation and higher quantum efficiency in the 350 nm to 680 nm range results in a very strong intensifier response leading to image saturation in conventional night vision systems whenever an intense visible light source comes into the view of the objective lens. This image saturation is called a "bloom" in night vision cameras, as mentioned previously.

Thus, by dividing the incoming beam of radiation 120 into two spectral components with essentially all visible radiation (i.e., radiation lower than about 680 n) being directed to the first optical branch 115a and essentially only the near infra-red spectral components and some of the deep red components (i.e., greater than about 680 nm) being directed into the second optical branch 115b with minimal loss of the precious little optical power collected through the objective lens 105, the above bloom can be effectively addressed. It will be appreciated that such a scheme provides good results in the optical system of FIG. 1 because, as shown in FIG. 3, typical current amplifier sensitivity is higher near the band-edge of GaAs (850 nm). Higher current amplifier sensitivity near 850 nm results from the fact that photoelectrons generated by photons with energy close to the semiconductor (GaAs) band-gap can acquire higher velocities within the p$^+$-GaAs diffusion layer due to lower inter valley scattering. The photoelectrons generated by photons with significantly higher energy than the band-gap undergo strong inter valley scattering upon their creation due to their higher initial excess energy.

Figure 4:
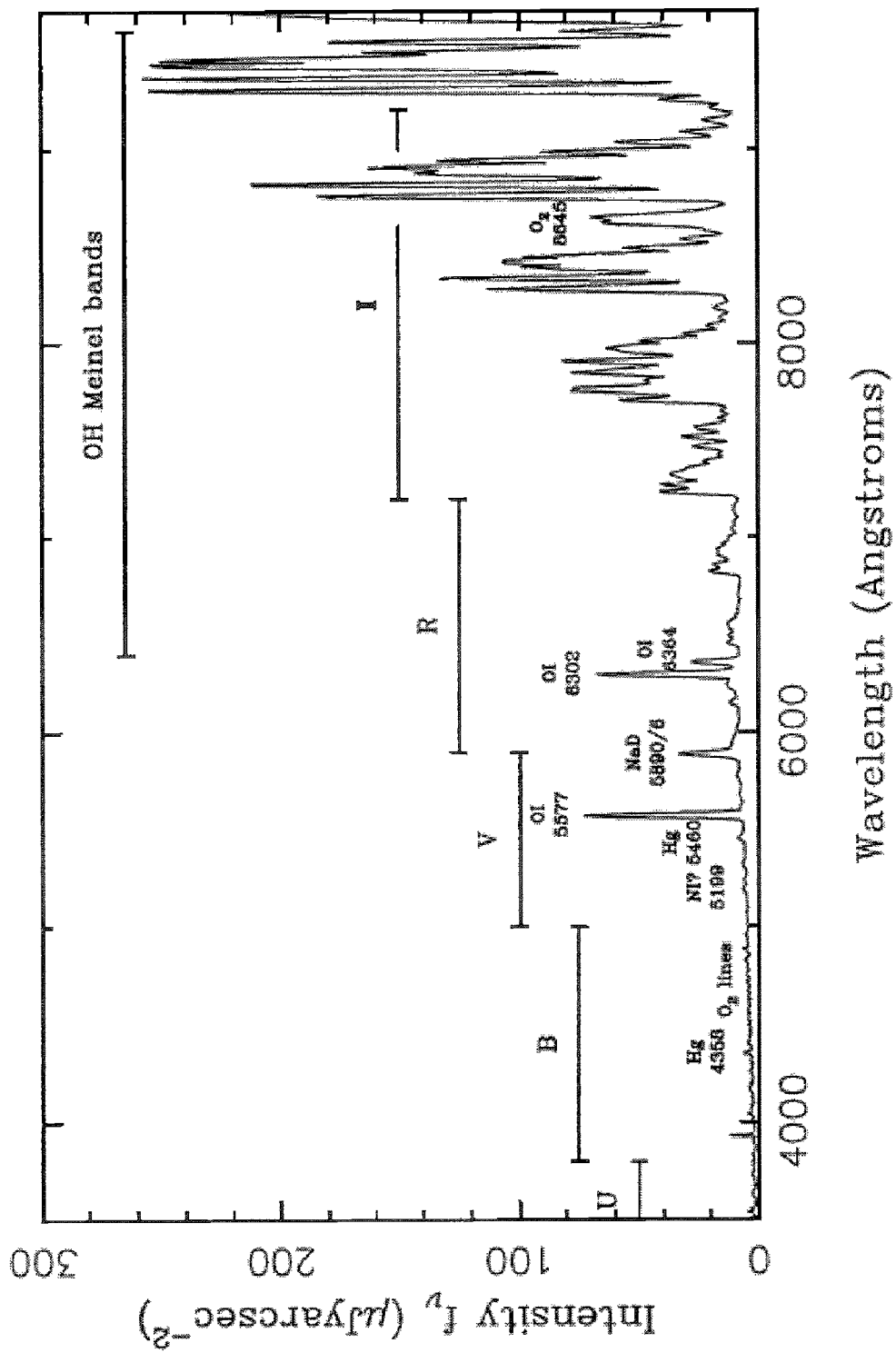
FIG. 4 shows the spectral intensity of a clear night sky in the Ultra Violet, Blue, visible, Red, and near infra-red bands as observed at a remote observation post at La Palma, Spain.

It will be appreciated that removing the visible band from the incident radiation does not affect the night vision function of the optical system of FIG. 1 because the spectral power in the near infra-red band on a moonless night is in fact five to seven times higher than in the visible band. FIG. 4 shows the spectral power as observed at a remote observation post at La Palma (Canary Islands, Spain) on a clear moonless night. As shown in FIG. 4, most of the near infra-red radiation resulting from airglow and zodiacal light, if effectively used for night vision, can more than compensate for the removal of the visible band from the second visible optical branch of FIG. 1. Zodiacal light is light that is produced by sunlight reflecting off dust particles present in the solar system. On a full moon night, the intensity in the visible and near infra-red spectral bands increases to about 720 and 443 $\mu Jy/arcsec^2$ respectively, therefore concentrating on a near infra-red band alone for night vision function will not be disadvantageous. Although incandescent bulbs, which generate significant radiation in the near infra-red band may be a cause of concern in bloom free operation of night vision cameras, most of the modern street lighting is based on Hg, Na, or halogen lamps which do not contribute significantly at near infra-red.

Figure 5:
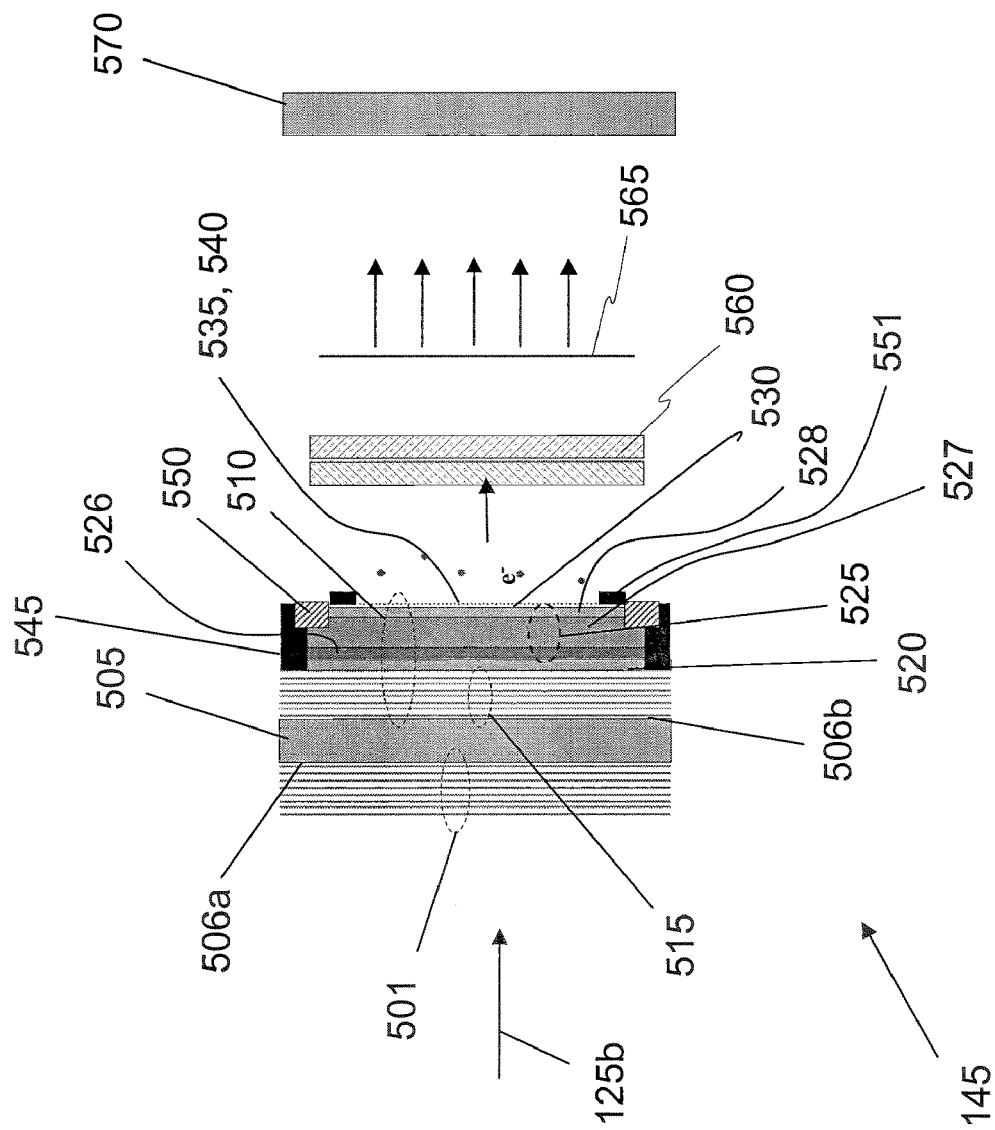
FIG. 5 shows a schematic representation of a photocathode in accordance with an embodiment of the invention.

Referring back to FIG. 1, after passing through the third anti-reflective medium/coating 177, the second radiation beam 125b, which includes the near infra-red spectral band, is focused onto the image intensifier 145 with the second optical assembly 135. FIG. 5 shows the image intensifier 145 in accordance with an embodiment of the invention.

Image intensifier 145 includes an anti-reflective medium/coating 501 that is positioned on a first side 506a of an entrance window 505. The entrance window 505, which may be made of glass, is an optically thick element that may be considered as an incoherent medium where no interference effects are expected. Typically, in order to be treated as an incoherent medium, the entrance window 505 has a thickness that is at least about ten times the midband radiation wavelength of the second spectral band, e.g., the near infra-red band. The anti-reflective medium/coating 501 is optimized for wavelengths greater than about 680 nm so as to reduce the reflection losses at the first side 506a of the entrance window 505. This anti-reflective medium/coating 501 may also serve as a filter for radiation lower than about 680 nm, thereby further reducing the amount of visible radiation reaching the image active layer of the image intensifier 145 and thus further blocking bloom causing radiation. With such an arrangement, up to ten times additional filtering can be achieved with this anti-reflective medium/coating 501. As such, it is expected that less than about 0.1% of the incoming second radiation beam 125b passing through the entrance window 505 will include visible radiation. A photocathode 510, which is described in more detail below, is bonded to the second side 506b of the entrance window 505 with the help of low melting temperature glass at substrate temperatures lower than about 500° C. It will be appreciated that the thickness of this glass bonding film does not affect the coherent properties of the photocathode if the glass bonding film's index is matched to that of the entrance window 505.

As shown in FIG. 5, the photocathode 510 is essentially a two terminal photocathode that includes successively a dielectric coating 515, an Indium Tin Oxide (ITO) layer 520 and a modified PIN structure 525 that includes a n+ doped semiconductor layer 526, an intrinsic layer 527 and a p+ doped semiconductor layer 528. The photocathode 510 also includes an activation layer 530, a thin semiconductor insulating grid 535 and a metal grid 540.

Figure 6:
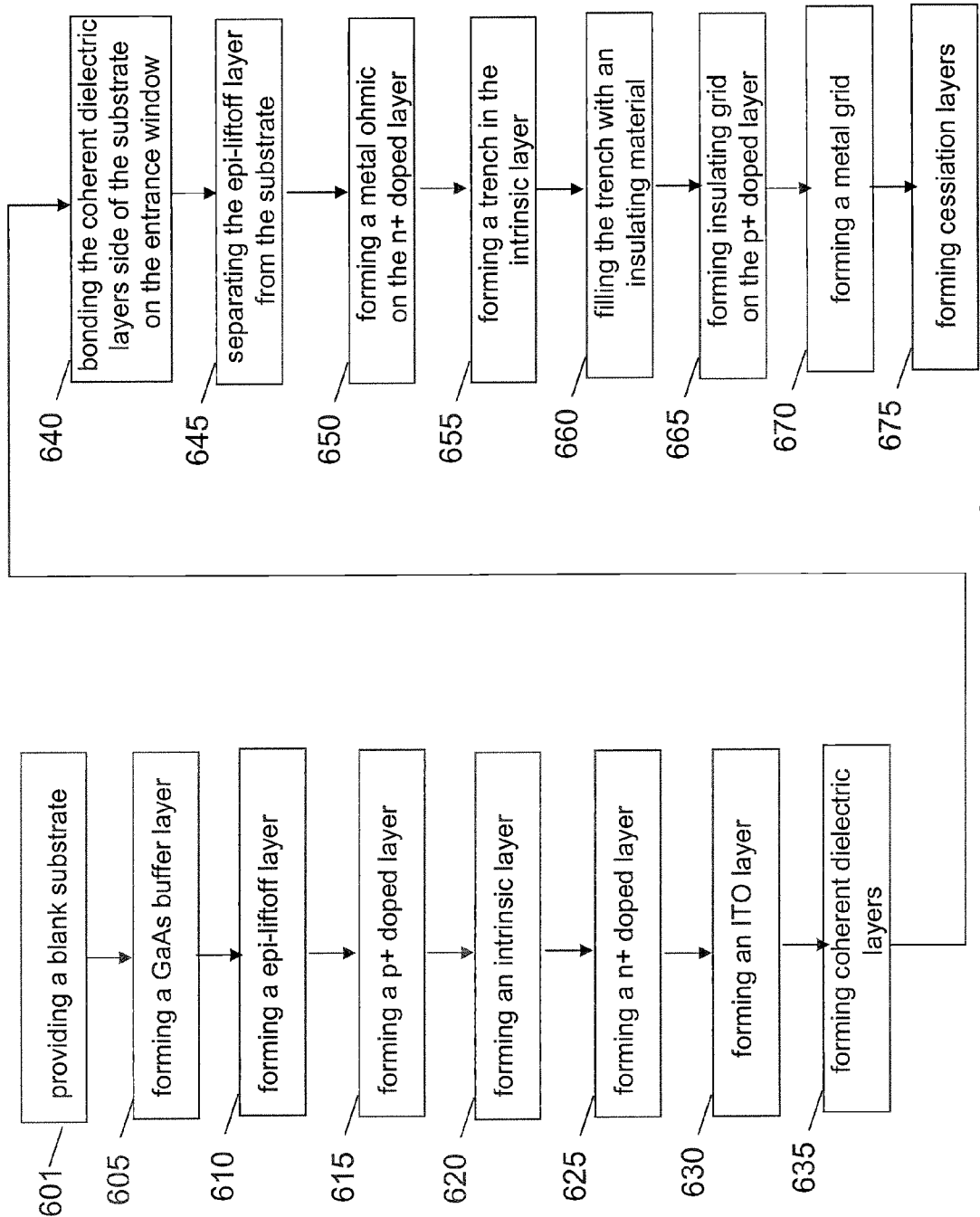
FIG. 6 shows a method for manufacturing the photocathode of FIG. 5 in accordance with an embodiment of the invention.

FIG. 6 shows an exemplary flowchart 600 for fabricating the photocathode 510 in accordance with an embodiment of the invention. The method 600 begins at block 601 where a blank substrate is provided and proceeds to block 605 where a thin layer of Gallium (III) Arsenide GaAs buffer layer is grown on a cleaned substrate. The Gallium (III) Arsenide GaAs buffer layer acts as a clean seed layer for the active device. Then, the method 600 proceeds to block 610 where a thin layer of epi-liftoff layer is grown on the GaAs buffer layer to help separate the active device from the substrate after the growth and subsequent transfer to the above entrance window 505. On top of the liftoff layer, the thin p+ doped semiconductor layer 528 smaller than, for example, 20 nm thick is grown on the epi-liftoff layer (block 615) followed by the growth of the accurately compensated or intrinsic layer 527 (block 620). In an embodiment, the accurately compensated or intrinsic layer 527 is about 500 nm to 1000 nm thick. Finally, the thin n+ doped semiconductor layer 526 is grown on the intrinsic layer 527 (block 625), thereby completing the active device growth. In an embodiment, the n+ doped semiconductor layer 526 is approximately 10 nm thick. The material growth is performed under standard growth conditions such as, for example, at substrate temperatures greater than about 580° C.

After assembling the modified PIN structure 525, the method 600 proceeds to blocks 630 and 635 where a thin transparent, but electrically conductive film such as Odium Tin Oxide (ITO) layer 520 is deposited on the n+ doped semiconductor layer 526 followed by several alternating layers of high (H) and low (L) refractive index films such as $Si/SiO_2$ or $Ta_2O_5/SiO_2$. Thus, coherent dielectric layers are formed at block 635.

The completed thin layer assembly is then bonded to the entrance window 505 using the previously mentioned low temperature glass (block 640). The method then proceeds to block 645 where the substrate is separated at the sacrificial epi-liftoff layer from the active device which is now permanently bonded to the entrance window 505 as shown in FIG. 5. After separating the substrate, a metal ohmic contact 545 in the shape of a circular ring is then formed on the n+ doped semiconductor layer 526 (block 650).

Using conventional photolithographic and plasma etching techniques, a trench 550 is formed in the accurately compensated or intrinsic layer 527 (block 655), which is subsequently filled with an insulating material such as, for example, silicon nitride SiN (block 660). In one implementation, the isolation of the trench 550 extends within about 75% of the intrinsic layer 527 to ensure a uniform filed gradient in the intrinsic layer 527. Then, after forming the isolation trench 550, the method proceeds to block 665, where a suitable grid pattern is lithographed in a resist film such as PMMA and a thin layer of Aluminum is deposited. This layer of Aluminum is oxidized in situ to form an Aluminum Oxide $Al_2O_3$ insulating grid 535. In one embodiment, the insulating grid 535 has a thickness of about 10 nm. Subsequently, a thin layer of Tungsten W (<10 nm) is deposited on top of the Aluminum Oxide to form the metal grid 540 (block 670). In the photocathode 510, the thin metal grid 540 acts as a first electrode and the n+ doped semiconductor layer 526 and Indium Tin Oxide 520 act as a second electrode. The metal grid 540 is contacted with a ring 551, as shown in FIG. 5.

After completing the electrode fabrication process, the surface of the p+ doped semiconductor 528 is activated and the free surface of the p+ doped semiconductor layer 528 is cessiated (block 675) to achieve negative electron affinity, as will be explained in more detail below. In a conventional cessiation process the semiconductor surface is heated to a temperature greater than about 600° C. in an ultra high vacuum chamber to disassociate adsorbed oxygen and carbon impurities and expose atomically clean semiconductor before depositing carefully controlled atomic layers of Cesium Cs and Oxygen. The Cesium Oxygen layers that are used to activate the p+ doped semiconductor layer 528 are denoted as 530 in FIG. 5. In the embodiment shown in FIG. 5, such high substrate temperatures involved during cessiation may not be suitable due to the presence of various oxidized thin films, glass entrance window, as well as ultra thin p+ and n+ doped semiconductor layers 526, 528. Instead, a low temperature substrate cleaning technique using atomic hydrogen plasma may be employed in an embodiment. In this technique, superior cleaning to thermal process is achieved at substrate temperatures lower than about 400° C., which is benign to the present device architecture.

In the exemplary process for fabricating the photocathode 510 of FIG. 6, the active volume of the photocathode 510 may be either heteroepitaxially grown Gallium (III) Arsenide GaAs or metamorphic Indium Gallium Arsenide InGaAs with variable concentration of Indium. It will be appreciated that embodiments of the present invention are equally applicable to these materials as well as other materials such as InGaAs grown on Indium Phosphide InP substrates. These materials and those used in the image intensifier 145 may be grown using either Molecular Beam Epitaxy MBE or Metal-Organic Chemical Vapor Deposition MOCVD techniques.

Referring back to FIG. 5, the image intensifier 145 also includes a current amplifier 560, a phosphor screen 565 and an exit window 570. The photocathode 510, the current amplifier 560 and the phosphor screen 665 as well as other protection circuits, if desired, are enclosed in an evacuated and hermetically sealed tube (not shown in FIG. 5) positioned between the entrance window 505 and the exit window 570. In one implementation, the current amplifier 560 includes Micro Channel Plates (MCP amplifier) that are configured to amplify the number of photoelectrons that are produced by the photocathode 510. Specifically, each photoelectron produced by the photocathode and reaching the vacuum is accelerated towards the MCP amplifier 560 with the help of an electric field applied between the plates of the MCP amplifier 560 and the metal grid 540. Each electron incident on the MCP amplifier 560 generates hundreds of thousands of secondary electrons thereby producing the desired image amplification. To achieve proximity projection of the image onto the MCP and reduce halo effects, the distance between the MCP amplifier 560 and the photocathode 510 may be in the order of a few microns.

In one implementation, a few kVolts of bias voltage may be applied between the front and back faces of the MCP amplifier 560 to energize the electrons for higher amplification. The thin phosphor screen 565 may be deposited on the exit surface of the MCP amplifier 560 to allow proximity projection of the image information contained in the output electron flux. In the embodiment of FIG. 5, it is thus possible to obtain an optical image, which is significantly amplified, well above the detection level of conventional Charge Coupled Device CCD cameras included in the imaging system 155 shown in FIG. 1.

As shown in FIG. 1, the light emitted by the phosphor screen 565 is focused on the imaging system 155 (e.g., a CCD camera). The imaging system 155 is placed outside the exit window 570 with its own optical assembly (e.g., lens system) to capture the image and provide digital video stream. In an embodiment, the intermediate phosphor screen 565 is eliminated by integrating the CCD array inside the image intensifier 145 where the electron flux emerging from the MCP amplifier 560 is proximity projected onto the CCD array to generate a digital image. It will be appreciated that further design improvements may be provided in additional embodiments of the invention.

Referring back to FIG. 5, the dielectric coating 515 is an optically coherent layer that includes several alternating layers of high and low refractive index films such as Silicon/Silicon Dioxide (Si/SiO$_2$) or Tantalum Dioxide/Silicon Dioxide Ta$_2$O$_5$/SiO$_2$. The materials and thicknesses of the different layers in the dielectric coating 515 may be selected to serve a dual purpose. First, the materials and thicknesses of the different layers in the dielectric coating 515 are selected to further reduce the transmission of any remaining visible radiation passing through the entrance window 505. In an embodiment of the invention, the materials and thicknesses are optimized to remove at least about 90% of the amount of visible radiation passing through the entrance window 505 and reaching the active layer 525 of the photocathode 510. In so doing, it is possible to reduce the amount of visible radiation reaching the active layer 525 to less than about 0.01%. As a result, the photoelectrons generated by the active layer 525 of the photocathode 510 will consist almost exclusively of photoelectrons produced by the infra-red spectral band (e.g., the near infra-red band and some portions of the deep infra-red band). Second, the materials and thicknesses of the different layers in the dielectric coating 515 are selected to maximize the absorption of the second spectral band of interest, i.e. the near infra-red band and some portions of the deep infra-red band, within the active layer 525 (i.e., PIN structure) of the photocathode 510.

Specifically, the materials and thicknesses of the dielectric coating 515, the thickness of the ITO layer 520, and the materials and thicknesses of the active layer 525 (e.g., n+ doped semiconductor layer 526, the intrinsic layer 527 and the p+ doped layer 528) are selected so that these layers form together an optically coherent layer that enhances the formation of standing waves within the active layer 525 of the photocathode 510. Formation of standing waves within the active layer 525 maximizes the creation of photoelectrons. Thus, in the image intensifier 145 of FIG. 5, virtually any radiation belonging to the second spectral band of interest (i.e., the near infra-red band and some portions of the deep infra-red band) that reaches the active layer 525 will be absorbed within the active layer 525, thereby maximizing the external quantum efficiency of the optical system 100.

It will be appreciated that the external quantum efficiency of the optical system 100 is also maximized by virtue of the fact that the first and third anti-reflecting mediums/coatings 173, 177, the dichroic mirror 175 and the anti-reflective medium/coating 501 are configured (in terms of thicknesses and materials) to substantially transmit any radiation belonging to the near infra-red band (and also belonging to some portions of the deep infra-red band) towards the photocathode 510. Thus, in the optical system 100 of FIG. 1, most of the radiations in the incoming beam of radiation 520 that belong to the near infra-red band will create a photoelectron with the active layer 525.

Figure 7B:
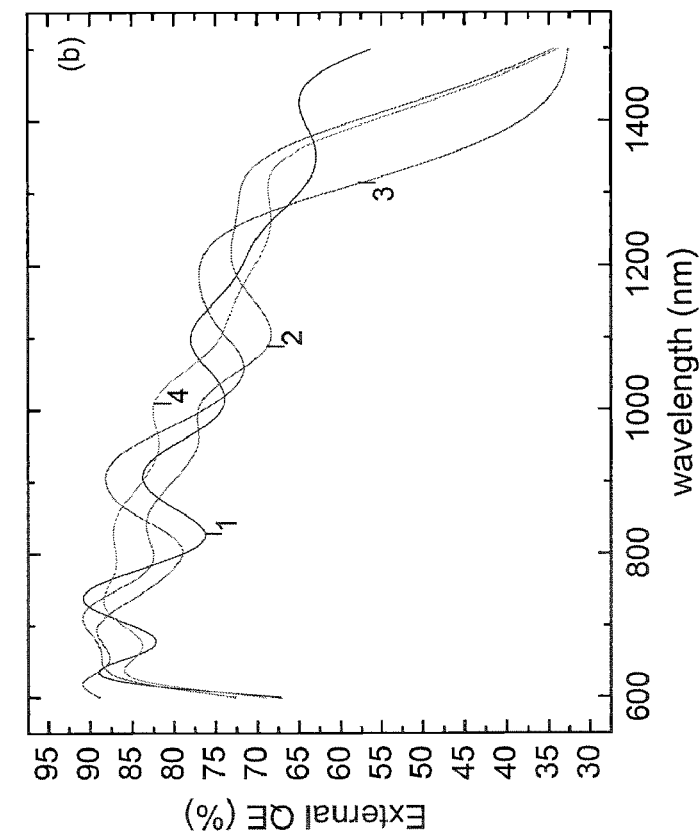
FIGS. 7a-b show the calculated external quantum efficiency QE of, respectively, a GaAs photocathode and a $In_{0.53}Ga_{0.47}As$ photocathode, in accordance with an embodiment of the invention.
Figure 7A:
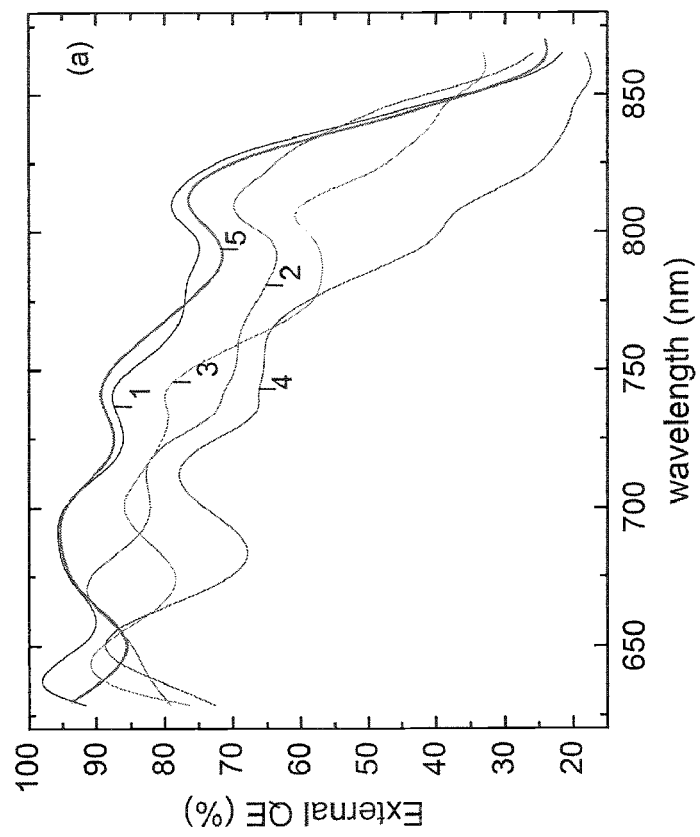

FIGS. 7a-b show the calculated external quantum efficiency as a function of radiation wavelength for the photocathode 510 design of FIG. 5 including Gallium(III) Arsenide GaAs as the activation layer (FIG. 7a) and Indium Gallium Arsenide InGaAs as the activation layer (FIG. 7b). FIG. 7a shows external quantum efficiency curves for five different layer structures with varying thicknesses of Gallium(III) Arsenide GaAs active layer 515, different dielectric coatings 515 (Si/SiO$_2$), as well as with and without the ITO layer 520. The five different layer structures (I1, I2, I3, I4 and I5) represented in FIG. 7a are provided in Table 2. Values are given in nanometers.

TABLE 2

|  | I1 | I2 | I3 | I4 | I5 |
|---|---|---|---|---|---|
| GaAs | 1000 | 675 | 600 | 500 | 1000 |
| ITO | 0 | 0 | 0 | 0 | 20 |
| SiO2 | 65 | 49 | 60 | 45 | 41 |
| Si | 20 | 17 | 19 | 29 | 20 |
| SiO2 | 75 | 73 | 85 | 44 | 75 |
| Si | 23 | 18 | 22 | 33 | 23 |
| SiO2 | 95 | 65 | 92 | 64 | 95 |
| Si | 19 | 20 | 19 | 20 | 19 |
| SiO2 | 75 | 72 | 72 | 54 | 75 |
| Si | 21 | 21 | 24 | 22 | 21 |
| SiO2 | 70 | 71 | 61 | 67 | 70 |
| Si | 18 | 22 | 21 | 19 | 18 |
| SiO2 | 60 | 78 | 70 | 65 | 58 |
| Si | 19 | 20 | 19 | 21 | 19 |
| SiO2 | 65 | 70 | 75 | 0 | 63 |
| Si | 23 | 25 | 24 | 0 | 23 |
| SiO2 | 60 | 64 | 65 | 0 | 64 |
| Si | 18 | 16 | 15 | 0 | 16 |

Similarly, FIG. 7b shows the external quantum efficiency curves for four different layer structures with varying thicknesses of Indium Gallium(III) Arsenide In0.53Ga0.47As an active layer 515, different dielectric coatings 515 (Si/SiO2), as well as with and without the ITO layer 520. The four different layer structures (I1, I2, I3 and I4) represented in FIG. 7b are provided in Table 3. Values are given in nanometers.

TABLE 3

|  | I1 | I2 | I3 | I4 |
|---|---|---|---|---|
| InGaAs | 600 | 550 | 550 | 500 |
| ITO | 50 | 50 | 50 | 50 |
| SiO2 | 60 | 60 | 60 | 60 |
| Si | 12 | 11 | 10 | 9 |
| SiO2 | 85 | 88 | 101 | 101 |
| Si | 18 | 18 | 16 | 15 |
| SiO2 | 73 | 73 | 72 | 75 |
| Si | 18 | 18 | 17 | 18 |
| SiO2 | 64 | 64 | 65 | 64 |
| Si | 15 | 15 | 13 | 12 |
| SiO2 | 73 | 73 | 73 | 68 |
| Si | 14 | 14 | 13 | 12 |
| SiO2 | 74 | 74 | 74 | 70 |
| Si | 16 | 16 | 15 | 12 |
| SiO2 | 66 | 66 | 65 | 67 |
| Si | 14 | 14 | 13 | 10 |
| SiO2 | 75 | 75 | 80 | 80 |
| Si | 8 | 6 | 6 | 6 |

Results shown in FIGS. 7a-b indicate that the external quantum efficiency of the optical system 100 can be drastically improved, as compared to a conventional optical system (see FIG. 3), with the collective use of the various anti-reflective mediums/coatings 173, 176, 177, dichroic mirror 175 and the coherent properties of the optical stack comprising high/low refractive index films, ITO, a and GaAs or AlGaAs absorbing layer. In FIG. 7a, a 1000 nm thick active structure (PIN) 525 with a thin layer of Indium Tin Oxide offers the best performance. However, due to higher bandwidth and higher available spectral power at wavelengths greater than about 850 nm, the InGaAs based photocathode can offer superior night vision capability to the GaAs based device.

The photocathode 510 is not only optimized to maximize the external quantum efficiency of the optical device 100 but also to maximize its internal quantum efficiency. The internal quantum efficiency is defined as the ratio of the number of electrons exiting the photocathode 510 to the number of photoelectrons generated in the active layer 525. In theory, if each photoelectron that is generated in the active layer 525 successfully exits the photocathode 510 (i.e. no recombination or loss of electron), the internal quantum efficiency of the photocathode is 1 (or 100%).

In conventional night vision systems, the incident low intensity radiation, which is passed through the transparent entrance window, generates electron hole pairs in the semiconductor layer/photocathode. The semiconductor used in a conventional night vision system is a p+ doped semiconductor layer (e.g., p+ doped GaAs) with a band gap in the 800 to 1700 nm range. The p+ doped semiconductor layer is necessary to achieve negative electron affinity. The photoelectrons generated in the p+ doped semiconductor layer drift to the surface where the electron affinity is lowered to below vacuum by the well known technique of cessiation. As mentioned previously, in this technique, with the deposition of a few alternating mono atomic layers of Cesium Cs and atomic Oxygen in an ultra-high vacuum chamber, the electron affinity of many semiconductors and semi-metals may be lowered to negative values (<0). With such a process, an electron reaching the free surface of the material will readily exit into the vacuum.

However, these conventional night vision systems have a low internal quantum efficiency (typically lower than about 45%) in the entire near infra red band due to the fact that photoelectrons generated in the p+ doped semiconductor layer diffuse slowly rather than drift at high velocity. Although theoretically the diffusion length of electrons in $p^+$-GaAs is expected to be greater than about 10 µm, in practice however, in heavily doped GaAs the crystalline defects lower the drift length to less than about 1 µm. Therefore, even in a 0.5 µm thick photocathode, a significant number of electrons recombine with excess holes present in the active layer leading to lower internal quantum efficiency.

In the embodiment of FIG. 5, the internal quantum efficiency of the photocathode is significantly improved by substantially reducing the recombination of the photoelectrons generated in the active layer during their migration towards the Cesium Oxide activation layer 530. Reduction of the recombination of the photoelectrons within the photocathode 510 is achieved in an embodiment of the invention by leaving a substantial portion of the semiconductor layer intrinsic (i.e., not doped). In this embodiment, only a thin portion of the p+ doped semiconductor remains in the photocathode 510 in order to achieve the necessary negative electron affinity at the surface that is desirable to extract the electrons into the vacuum.

Referring now to FIGS. 8a and 8b, these figures show, respectively, a schematic cross section of a portion of the photocathode 510 and the energy band diagram of the modified PIN structure 525. The portion of the photocathode 520 shown in FIG. 8a includes the ITO layer 520, the n+ doped semiconductor layer 526, the intrinsic layer 527, the p+ doped semiconductor layer 528, the Cesium Oxide activation layer 530, the insulating grid 535 and the metal grid 540. The energy diagram of FIG. 5b shows the variation of the energy levels of the conduction band and valence band across the PIN structure 525 without a voltage bias and without layers 530, 535 and 540. Also shown in FIG. 8b is the Fermi energy level EF across the PIN structure 525. As known in the art, the valence band VB corresponds to the highest range of electron energies where electrons are normally present at absolute zero. The conduction band CB corresponds to the range of electron energies, higher than that of the valence band, that is sufficient to make the electrons free to accelerate under the influence of an applied electric field. The Fermi level corresponds to the energy of the least tightly held electrons within a solid.

As shown in FIG. 8b, the Fermi level of the n+ doped semiconductor is proximate the conduction band CB due to the presence of electron donor impurities in the semiconductor (e.g., GaAs). The Fermi level of the p+ doped semiconductor is proximate the valence band due to the presence of electron acceptor impurities in the semiconductor (e.g., GaAs). As known in the art, the presence of electron acceptor impurities creates holes within the valence band. Because the PIN structure of FIG. 8b is at the equilibrium, there is a continuity of the Fermi energy level across the structure.

In the PIN structure 525, as the intrinsic layer 527 is substantially thicker than the n+ and p+ doped semiconductor layers 526, 528, most of the photoelectrons are generated within the intrinsic active layer 527. As previously mentioned, these photoelectrons are generated by absorption of the standing waves within the PIN structure 525. In operation, these photoelectrons are accelerated towards the p+ layer by applying a voltage forward bias between the metal grid 540 and the n+ doped semiconductor layer 526 and ITO layer 520. It will be appreciated that the ITO layer 520 may be omitted depending on the quality and electrical conductivity of the n+ doped semiconductor layer 526.

The operation of the PIN structure 525 is qualitatively explained in FIGS. 9a-c. FIGS. 9a-c show the variation of the energy levels shown in FIG. 8b when a forward bias is applied between the metal grid 540 and the n+ doped semiconductor layer 526.

Referring first to FIG. 9a, this figure shows the unbiased PIN structure 525. This figure is substantially similar to FIG. 8b. FIG. 9a also shows the effect of the cessiation process on the energy levels of the p+ doped semiconductor layer 528.

As known in the art, a first depletion layer exists at the junction between the intrinsic layer 527 and the p+ doped semiconductor layer 528. The free electrons and holes near the junction tend to recombine with each other, producing a region depleted of any moving charges. This region corresponds to the first depletion region. The negatively charged acceptor impurities and positively charged donor impurities at the junction create a potential that tends to keep the depletion region swept clean of free charges once the depletion region has formed. A free electron now requires some extra energy to overcome the forces from the negatively charged acceptor atoms to be able to cross the first depletion region. The junction therefore acts like a barrier, blocking any charge flow current across the barrier. A second depletion region is also formed at the junction between the p+ doped semiconductor layer 528 and the metal grid 540. The association of the p+ doped semiconductor layer 528 and the metal grid 540 creates a Schottky barrier that bends the bands (conduction and valence bands) of the p+ doped semiconductor layer 528 upward since the Fermi energy in the metal differs from that in the p+ doped semiconductor layer 528. Accumulation of negative charge below the metal grid up to the Schottky barrier height is expected which limits further electron flow.

Still referring to FIG. 9a, this figure also shows the band bending effect of the Cesium Oxygen layers 530 on the energy levels of the p+ doped semiconductor layer 528. The few atomic layers of Cesium Oxygen create an activation region at the interface between the p+ doped semiconductor layer 528 and the vacuum that has an negative electron affinity. The electron affinity of a semiconductor corresponds to the energy separation between the vacuum level and the conduction band edge of the semiconductor. When this energy separation is negative, the electrons will lower their energy by exiting into the vacuum.

Now referring to FIGS. 9b-c, these figures show the variation of the energy levels of the PIN structure 525 under a forward bias at two separate locations in the p+ doped semiconductor layer 528. FIG. 9b shows the variation of the energy levels at a location on the p+ doped semiconductor layer 528 where the insulating grid 535 is present. FIG. 9c shows the variation of the energy levels at a location on the p+ doped semiconductor layer 528 where the insulating grid 535 is absent. For reference, these two locations are shown in FIG. 10.

Figure 10:
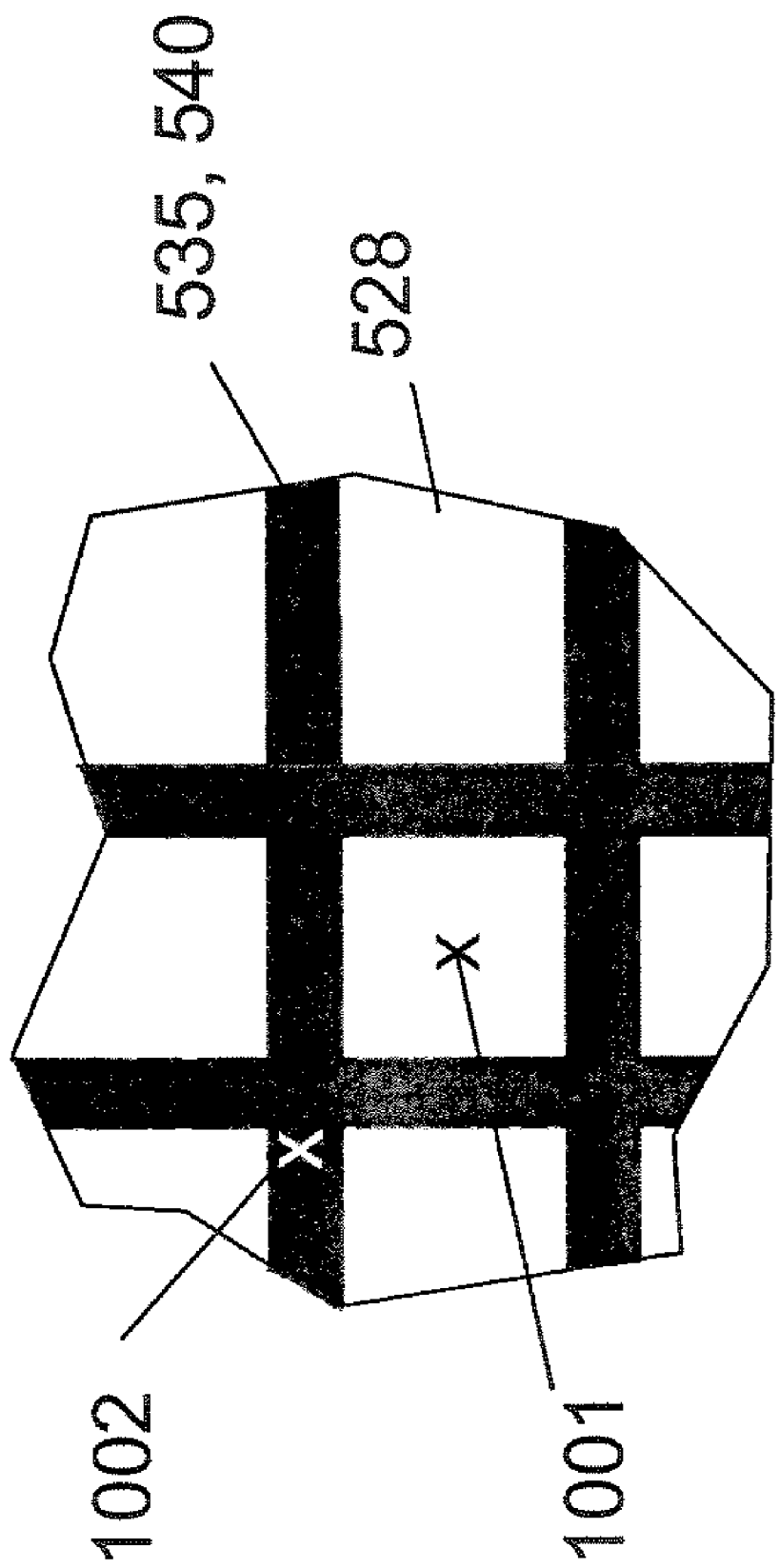
FIG. 10 shows a portion of the p+ doped semiconductor layer of the photocathode in accordance with an embodiment of the invention.

Specifically, FIG. 10 shows a portion of the p+ doped semiconductor layer 528 and the metal grid 540 and insulating grid 535. In FIG. 10, the metal grid 540 and insulating grid 535 are superposed on top of each other. In an embodiment, the surface area covered by the metal grid 540 and insulating grid 535 represents less than about 20% of the total surface area of the p+ doped semiconductor layer 538. The location on the p+ doped semiconductor layer 528 where the insulating grid 535 is present and corresponding to the energy diagram of FIG. 9b is denoted as 1002. The location on the p+ doped semiconductor layer 528 where the insulating grid 535 is absent and corresponding to the energy diagram of FIG. 9c is denoted as 1001.

Referring once again to FIGS. 9b-c, as a forward bias (positive field) is applied to the metal grid 540, the Fermi energy of the metal grid 540 is lowered with respect to the Fermi energy of the p+ doped semiconductor layer 528. This results in an enhanced band bending in the p+ doped semiconductor layer 528 because the second depletion region formed at the junction between the metal grid 540 and the p+ doped semiconductor layer 528 is decreased. This forward bias reduces the first depletion region as well and thus the potential barrier formed at the junction of the intrinsic layer 527 and the p+ doped semiconductor layer 528 so that the photoelectrons generated in the intrinsic layer 527 can now drift in the intrinsic layer 527 toward the p+ doped semiconductor layer 528. After drifting through the intrinsic layer 527, the photoelectrons generated will diffuse through the p+ doped semiconductor layer 528 toward the vacuum. Because the thickness of the p+ doped semiconductor layer 528 is substantially small (e.g., smaller than about 20 nm), almost no photoelectrons will recombine with holes present in the p+ doped semiconductor layer 528. During diffusion, the photoelectrons will either be trapped below in the insulating grid 535 (FIG. 9b) or exit freely into the vacuum (FIG. 9c).

The electrons in the region 1001 which extends into a significant volume of the p+ doped semiconductor layer 528 will escape into the vacuum due to negative electron affinity in the regions where no metal is present. The positive fields generated by the metal grid 540 and positively biased MCP plates 560 penetrate deeper into the p+ doped semiconductor layer 528 and the intrinsic layer 527 bending the bands as shown qualitatively. A fraction f of the bias voltage $V_{bias}$ is shown as the difference between the Fermi Energy in the p+ dope semiconductor layer 528 and the metal (W) of the metal grid 540. As most of the electrons drifting in the intrinsic layer 527 attain high drift velocities and escape the thin p+ semiconductor layer 528 with little recombination, a significant fraction of the bias voltage drops across the intrinsic layer 527 thereby lowering the first depletion region further.

The time needed for the photoelectrons to drift through the intrinsic layer 527 is in the order of ten to a few hundred picoseconds whereas the time needed for the photoelectrons to recombine with holes is in the order of nanoseconds. Thus, it will be appreciated that most of the photoelectrons will not recombine with holes in the intrinsic layer 527.

In addition, it will be appreciated that the use of the insulating grid 535 will significantly reduce the dark current created in the photocathode 510. The dark current corresponds to the flow of electrons that is spontaneously generated without the use of radiations. As will be appreciated, a significant dark current may be generated when the forward bias is applied. Unlike the photoelectrons generated with radiation, these electrons do not have enough energy to exit into the vacuum. The flux of electrons associated with the dark current will also drift toward the p+ doped semiconductor layer 527 and could potentially damage the entire device due to thermal heating if they are allowed to flow into the metal grid 540. However, by positioning the insulating grid 535, for example, underneath the metal grid 540, the electrons associated with the dark current will be blocked below the highly resistive grid 535.

It will be appreciated that the use of a modified PIN structure 525 shown in the embodiment of FIG. 5 may significantly increase the internal quantum efficiency of the optical device. Unlike conventional devices, most of the photoelectrons generated in the modified PIN structure 525 will not recombine and will readily exit into the vacuum. Furthermore, because most of the photoelectrons are generated with the second spectral band of interest, i.e., the near infra-red band and some portions of the deep infra-red band, the spread of energies of the photoelectrons that exit into the vacuum will be significantly reduced. The reduction of the spread of energies of the photoelectrons allows one to increase the accelerating voltage across the current amplifier 560 (e.g., MPC plates). Also, it will be appreciated that, unlike conventional night vision systems, the regions of the current amplifier (e.g., MCP plates) 560 will not be exposed to high intensity light/radiation because the visible spectrum has been removed in the second optical assembly (near infra-red band). Thus, noise, black spots, and graininess in the video that are generally encountered over continued operation of a conventional camera will be significantly reduced and the longevity and efficiency of the current amplifier 560 (e.g., MCP plates) and the photocathode 510 will be significantly improved.

Referring back to FIG. 1, the image provided by the first imaging system 135 and the second imaging system 140 may be combined to allow the user to simultaneously and efficiently display the first and the second spectral bands without the use of the operator's intervention. It will be appreciated that bloomings will not occur in the optical system shown in the embodiment of FIG. 1 because the visible spectrum has been effectively removed from the second radiation beam 125b.

Although a particular configuration of the optical system has been shown, the present invention is not limited to this configuration and a variety of other arrangements may be used in other embodiments of the invention. For example, the outputs of two imaging systems 135, 155 could be routed to a single display as opposed to two displays, and the single display could be toggled manually or automatically (e.g., by a photosensor) between the two imaging types, or they could be displayed simultaneously in split-screen fashion. Likewise, it will be appreciated that, instead of using a visible/night vision combo system, a pure night vision system may be provided in an embodiment of the invention. The night vision system may be assembled in a substantially similar manner as that of FIG. 1. However, the spectral band separator 175 (e.g., the dichroic mirror) may be positioned at about 90° relative to the incoming beam of radiation, instead of 45°. Likewise, any other possible way of filtering visible light may be used if the night vision system is to be used alone. Such a night vision only version may be incorporated into a pair of goggles.

As will be appreciated by one of ordinary skill in the art, the night vision system, in accordance with an embodiment of the invention is adapted to enhance the video quality of a night vision (near) infra-red camera while significantly improving the longevity and efficiency of the various components used in the camera (e.g., image intensifier, current amplifier (MCP plates)). The night vision optical system constructed in accordance with an embodiment of the invention may be used in portable applications, such as, for example, individual night vision goggles, portable cameras or any other device for which portability by a person is desirable. However, it should be understood that the present invention may be practiced on larger scale, non-portable devices, and the benefit of portability is not intended to be limiting. For example, the night vision systems may be embedded in aircrafts (helicopters or airplanes), boats and vehicles. To the contrary, the embodiments of the present invention are not limited to portability, but they are believed to be useable for achieving portability.

Where references are made to directions in this description or in the claims (e.g., up, down, bottom, top, left, right, etc.), it should be understood that these references are made with respect to the Figures for convenience of the reader. These directional references should not be regarded as limiting the invention to any particular orientation.

The foregoing illustrated embodiment(s) have been provided solely for illustrating the structural and functional principles of the present invention and are not intended to be limiting. To the contrary, the present invention is intended to encompass all modifications, substitutions, alterations, and equivalents within the spirit and scope of the following appended claims.

What is claimed is:

1. An imaging system comprising:
    an image intensifier configured to intensify a beam of radiation, the image intensifier including a negative electron affinity photocathode configured to produce a flux of photoelectrons when exposed to the beam of radiation, the beam of radiation including essentially radiations in a selected spectral band, the photocathode including a n+ doped semiconductor layer, one or more dielectric layers, an intrinsic semiconductor layer and a p+ doped semiconductor layer, the intrinsic semiconductor layer substantially thicker than the p+ doped layer such that substantially all of the photoelectrons are produced in the intrinsic layer;
    a current amplifier configured to amplify flux of photoelectrons; and
    a display system configured to display an image of a scene in the selected spectral band associated to the beam of radiation based on the amplified flux of electrons,
    wherein the one or more dielectric layers, the n+ doped semiconductor layer, the intrinsic semiconductor layer and the p+ doped semiconductor layer are constructed and arranged to form an optically coherent layer for the beam of radiation, and
    wherein the one or more dielectric layers are selected to reduce transmission of radiations in spectral bands outside the selected spectral band in the beam of radiation.

2. The system of claim 1, wherein the coherent layer is adapted to produce standing waves within the intrinsic semiconductor layer.

3. The system of claim 1, wherein a first side of the p+ layer is cessiated to lower its electron affinity to substantially negative values.

4. The system of claim 3, wherein an insulating layer is positioned between the p+ doped layer and a first electrode, the first electrode part of an electrode assembly that is adapted to apply a voltage bias within the photocathode to migrate the photoelectrons from the intrinsic semiconductor layer toward the p+ doped semiconductor layer.

5. The system of claim 4, wherein the first electrode is a metal grid.

6. The system of claim 5, wherein the metal grid is traversed by the flux of photoelectrons.

7. An imaging system comprising:
an image intensifier configured to intensify a beam of radiation, the image intensifier including a negative electron affinity photocathode configured to produce a flux of photoelectrons when exposed to the beam of radiation, the beam of radiation including essentially radiations in a selected spectral band, the photocathode including a n+ doped semiconductor layer, one or more dielectric layers, an intrinsic semiconductor layer and a p+ doped semiconductor layer, the intrinsic semiconductor layer substantially thicker than the p+ doped layer such that substantially all of the photoelectrons are produced in the intrinsic layer;
a current amplifier configured to amplify the flux of photoelectrons;
a display system configured to display an image of a scene in the selected spectral band associated to the beam of radiation based on the amplified flux of electrons, and
a first and a second electrode to apply a voltage bias within the photocathode to migrate the photoelectrons from the intrinsic semiconductor layer toward the p+ doped semiconductor layer and a substantially thin insulating layer positioned between the intrinsic layer and the first electrode to reduce dark current generated in the intrinsic layer,
wherein the one or more dielectric layers, the n+ doped semiconductor layer, the intrinsic semiconductor layer and the p+ doped semiconductor layer are constructed and arranged to form an optically coherent layer for the beam of radiation.

8. The system of claim 7, wherein the first electrode is a metal electrode positioned proximate a first side of the p+ doped semiconductor layer, the intrinsic layer positioned on a second side of the p+ doped semiconductor layer.

9. The system of claim 8, wherein the first electrode is a metal grid and the insulating layer is a grid substantially matching the first electrode grid.

10. The system of claim 9, wherein the metal grid has a metal surface area that is less than about 20% of a total surface area of the first side of the p+ doped semiconductor layer.

11. The system of claim 9, wherein the metal grid is traversed by the flux of photoelectrons.

12. The system of claim 7, wherein the second electrode is substantially transparent and is in electrical contact with the n+ doped semiconductor layer positioned on the intrinsic semiconductor layer.

13. The system of claim 7, wherein the one or more dielectric layers are selected to reduce transmission of radiations in spectral bands outside the selected spectral band in the beam of radiation.

14. An image intensifier configured to intensify a beam of radiation, the image intensifier comprising a photocathode configured to produce a flux of photoelectrons when exposed to the beam of radiation, the beam of radiation including essentially radiations in a selected spectral band, the photocathode including a n+ doped semiconductor layer, one or more dielectric layers, an intrinsic semiconductor layer and a p+ doped semiconductor layer, the intrinsic semiconductor layer substantially thicker than the p+ doped layer such that substantially all of the photoelectrons are produced in the intrinsic layer,
wherein the one or more dielectric layers, the n+ doped semiconductor layer, the intrinsic semiconductor layer and the p+ doped semiconductor layer are constructed and arranged to form an optically coherent layer for the beam of radiation, and
wherein the one or more dielectric layers are selected to reduce transmission of radiations in spectral bands outside the selected spectral band of the beam of radiation.

15. The intensifier of claim 14, wherein the coherent layer adapted to produce standing waves within the intrinsic semiconductor layer.

16. An image intensifier configured to intensify a beam of radiation, the image intensifier comprising a photocathode configured to produce a flux of photoelectrons when exposed to the beam of radiation, the beam of radiation including essentially radiations in a selected spectral band, the photocathode including a n+ doped semiconductor layer, one or more dielectric layers, an intrinsic semiconductor layer and a p+ doped semiconductor layer, the intrinsic semiconductor layer substantially thicker than the p+ doped layer such that substantially all of the photoelectrons are produced in the intrinsic layer, and
a first and a second electrode to apply a voltage bias within the photocathode to migrate the photoelectrons from the intrinsic semiconductor layer toward the p+ doped semiconductor layer,
wherein the one or more dielectric layers, the n+ doped semiconductor layer, the intrinsic semiconductor layer and the p+ doped semiconductor layer are constructed and arranged to form an optically coherent layer for the beam of radiation.

17. The intensifier of claim 16, wherein the first electrode is a metal electrode positioned proximate a first side of the p+ doped semiconductor layer, the intrinsic layer positioned on a second side of the p+ doped semiconductor layer.

18. The intensifier of claim 17, wherein the first electrode is a metal grid.

19. The intensifier of claim 18, wherein the metal grid has a metal surface area that is less than about 20% of a total surface area of the first side of the p+ doped semiconductor layer.

20. The intensifier of claim 19, wherein the metal grid is traversed by the flux of photoelectrons.

21. The intensifier of claim 16, wherein the second electrode includes the n+ doped semiconductor layer positioned on the intrinsic semiconductor layer.

22. The intensifier of claim 16, wherein the one or more dielectric layers are selected to reduce transmission of radiations in spectral bands outside the selected spectral band in the beam of radiation.

23. An image intensifier configured to intensify a beam of radiation, the image intensifier comprising a photocathode configured to produce a flux of photoelectrons when exposed to the beam of radiation, the beam of radiation including essentially radiations in a selected spectral band, the photocathode including a n+ doped semiconductor layer, one or more dielectric layers, an intrinsic semiconductor layer and a p+ doped semiconductor layer, the intrinsic semiconductor layer substantially thicker than the p+ doped layer such that substantially all of the photoelectrons are produced in the intrinsic layer, and
an insulating layer configured to reduce dark current generated in the intrinsic layer, wherein the one or more dielectric layers, the n+ doped semiconductor layer, the intrinsic semiconductor layer and the p+ doped semiconductor layer are constructed and arranged to form an optically coherent layer for the beam of radiation.

24. The intensifier of claim 23, wherein the insulating layer is positioned between the p+ doped semiconductor layer and a first electrode, the first electrode part of an electrode assembly that is adapted to apply a voltage bias within the photocathode to migrate the photoelectrons from the intrinsic semiconductor layer toward the p+ doped semiconductor layer.

25. The intensifier of claim 24, wherein the first electrode is a metal grid.

26. The intensifier of claim 25, wherein the metal grid is traversed by the flux of photoelectrons.

27. The intensifier of claim 23, wherein the one or more dielectric layers are selected to reduce transmission of radiations in spectral bands outside the selected spectral band in the beam of radiation.

28. An image intensifier configured to intensify a beam of radiation, the image intensifier comprising a photocathode configured to produce a flux of photoelectrons when exposed to the beam of radiation, the beam of radiation including essentially radiations in a selected spectral band, the photocathode including a n+ doped semiconductor layer, an intrinsic semiconductor layer and a p+ doped semiconductor layer, the intrinsic semiconductor layer substantially thicker than the p+ doped layer such that substantially all of the photoelectrons are produced in the intrinsic layer, and a first and a second electrode to apply a voltage bias within the photocathode to migrate the photoelectrons from the intrinsic semiconductor layer toward the p+ doped semiconductor layer and a substantially thin insulating layer positioned between the intrinsic layer and the first electrode to reduce dark current generated in the intrinsic layer, wherein the n+ doped semiconductor layer and the p+ doped semiconductor layer are arranged such that, in use, the beam of radiation enters the n+ doped semiconductor layer before reaching the p+ doped semiconductor layer.

29. The intensifier of claim 28, wherein the photocathode includes one or more dielectric layers and wherein the one or more dielectric layers, the n+ doped semiconductor layer, the intrinsic semiconductor layer and the p+ doped semiconductor layer are constructed and arranged to form an optically coherent layer for the beam of radiation.

30. The intensifier of claim 29, wherein the one or more dielectric layers are selected to reduce transmission of radiations in spectral bands outside the selected spectral band in the beam of radiation.

31. The intensifier of claim 28, wherein the first electrode is a metal electrode positioned proximate a first side of the p+ doped semiconductor layer, the intrinsic layer positioned on a second side of the p+ doped semiconductor layer.

32. The intensifier of claim 31, wherein the first electrode is a metal grid and the insulating layer is a grid substantially matching the first electrode grid.

33. The intensifier of claim 32, wherein the metal grid has a metal surface area that is less than about 20% of a total surface area of the first side of the p+ doped semiconductor layer.

34. The intensifier of claim 32, wherein the metal grid is traversed by the flux of photoelectrons.

35. The intensifier of claim 28, wherein the one or more dielectric layers are selected to reduce transmission of radiations in spectral bands outside the selected spectral band in the beam of radiation.

* * * * *